(12) United States Patent
Galperin

(10) Patent No.: US 8,571,930 B1
(45) Date of Patent: Oct. 29, 2013

(54) STRATEGIES FOR DETERMINING THE VALUE OF ADVERTISEMENTS USING RANDOMIZED PERFORMANCE ESTIMATES

(75) Inventor: Viatcheslav Galperin, Palo Alto, CA (US)

(73) Assignee: A9.COM, Inc., Palo Alto, CA (US)

( * ) Notice: Subject to any disclaimer, the term of this patent is extended or adjusted under 35 U.S.C. 154(b) by 2154 days.

(21) Appl. No.: 11/263,648

(22) Filed: Oct. 31, 2005

(51) Int. Cl.
*G06Q 30/00* (2012.01)

(52) U.S. Cl.
USPC .................................. 705/14.43; 705/14.52

(58) Field of Classification Search
USPC ...................................... 705/14, 14.43, 14.52
See application file for complete search history.

(56) References Cited

U.S. PATENT DOCUMENTS

| | | | |
|---|---|---|---|
| 5,758,257 A | 5/1998 | Herz et al. | |
| 5,960,411 A | 9/1999 | Hartman et al. | |
| 6,006,225 A | 12/1999 | Bowman et al. | |
| 6,029,141 A | 2/2000 | Bezos et al. | |
| 6,064,980 A | 5/2000 | Jacobi et al. | |
| 6,088,722 A | 7/2000 | Herz et al. | |
| 6,169,986 B1 | 1/2001 | Bowman et al. | |
| 6,185,558 B1 | 2/2001 | Bowman et al. | |
| 6,266,649 B1 | 7/2001 | Linden et al. | |
| 6,317,722 B1 | 11/2001 | Jacobi et al. | |
| 6,321,221 B1 | 11/2001 | Bieganski | |
| 6,366,910 B1 | 4/2002 | Rajaraman et al. | |
| 6,438,579 B1 | 8/2002 | Hosken | |
| 6,466,918 B1 | 10/2002 | Spiegel et al. | |
| 6,489,968 B1 | 12/2002 | Ortega et al. | |
| 6,571,243 B2 | 5/2003 | Gupta et al. | |
| 6,606,619 B2 | 8/2003 | Ortega et al. | |
| 6,625,609 B1 | 9/2003 | McDade et al. | |
| 6,711,586 B1 | 3/2004 | Wells | |
| 6,772,150 B1 | 8/2004 | Whitman et al. | |
| 6,785,671 B1 | 8/2004 | Bailey et al. | |
| 6,853,982 B2 | 2/2005 | Smith et al. | |
| 6,865,546 B1 | 3/2005 | Song | |
| 6,907,566 B1 * | 6/2005 | McElfresh et al. | ........... 715/210 |
| 2001/0014868 A1 | 8/2001 | Herz et al. | |
| 2002/0042738 A1 | 4/2002 | Srinivasan et al. | |
| 2003/0046161 A1 * | 3/2003 | Kamangar et al. | ............... 705/14 |
| 2004/0044571 A1 | 3/2004 | Bronnimann et al. | |
| 2004/0148222 A1 * | 7/2004 | Sabella et al. | .................. 705/14 |
| 2004/0186778 A1 * | 9/2004 | Margiloff et al. | ............... 705/14 |
| 2005/0055269 A1 | 3/2005 | Roetter et al. | |
| 2005/0055277 A1 * | 3/2005 | Green et al. | ..................... 705/14 |
| 2005/0137939 A1 * | 6/2005 | Calabria et al. | ................. 705/26 |
| 2005/0149396 A1 * | 7/2005 | Horowitz et al. | ............... 705/14 |
| 2005/0278443 A1 | 12/2005 | Winner et al. | |

OTHER PUBLICATIONS

Ryan et al., "Cost Per Action Ad Pricing," Aug. 23, 1999, available at <<http://www.clickz.com/experts/archives/media/media_sell/print.php/816821>>, 2 pages.

(Continued)

*Primary Examiner* — John Van Bramer
*Assistant Examiner* — Stacie Gatling
(74) *Attorney, Agent, or Firm* — Lee & Hayes, PLLC

(57) ABSTRACT

Strategies are described for conducting an advertising campaign using a cost-per-transaction (CPT) pricing model. In this model, the advertiser is charged when an end-user takes some express action in response to viewing the advertisement, such as by clicking on the advertisement, purchasing the advertised asset, performing a registration procedure, and so forth. Various solutions allow for the computation of the expected value of a CPT advertisement when there is a scarcity of data pertaining to the actual performance of the CPT advertisement.

18 Claims, 14 Drawing Sheets

(56) References Cited

OTHER PUBLICATIONS

Ryan et al., "Cost Per Action Pricing—Risks and Benefits," Aug. 16, 1999, available at <<http://www.clickz.com/experts/archives/media/media_sell/print.php/815381>>, 3 pages.

"How to Track Online Marketing ROI Using Cost-Per-Action," available at <<http://internet-martketing.mcdar.net/14892.php>>, accessed on Feb. 1, 2006, 4 pages.

Gilbert, "Google tries to patent Web syndication ads," Jul. 29, 2005, available at <<http://news.com.com/2100-1024_3-5810885.html>>, 2 pages.

"Google can help your business make more money," introductory web page describe Google.com advertising functionality, available at <<http://services.google.com/marketing/links/US-HA-CMBNINE2/>>, accessed on Feb. 1, 2006, 1 page.

U.S. Appl. No. 11/263,538, filed Oct. 31, 2005, Galperin et al., "Strategies for Determining the Value of Advertisements Using Data Mining Tools."

U.S. Appl. No. 11/263,552, filed Oct. 31, 2005, Galperin et al., "Strategies for Selecting Models for Use in Determining the Value of Advertisements."

U.S. Appl. No. 10/684,313, Mason, "Predictive Analysis of Browse Activity Data of Users of a Database Access system in Which Items are Arranged in a Hierarchy."

U.S. Appl. No. 11/041,522, filed Jan. 21, 2005, Holden et al, "Method and System for Automated Comparison of Items."

U.S. Appl. No. 10/996,343, filed Oct. 15, 2004, Vadon, "Identifying Items Relevant to a Keyword."

U.S. Appl. No. 10/966,827, filed Oct. 15, 2004, Vadon, "Identifying Items Relevant to a Keyword."

U.S. Appl. No. 10/817,554, filed Oct. 15, 2004, "Automated Detection of Associations Between Search Criteria and Item Categories Based on Collective Analysis of User Activity Data."

U.S. Appl. No. 10/864,288, filed Jun. 9, 2004, "Mining of User Activity Data to Extract Conditional Probability Data Reflective of User Selections From an Electronic Catalog."

U.S. Appl. No. 10/262,587, filed Sep. 30, 2002, "Information Retrieval Systems and Methods that Use User-Defined Lists to Identify Related Offerings."

U.S. Appl. No. 11/263,068, filed Oct. 31, 2005, Kushal Chakrabarti et al., "Strategies for Providing Diverse Recommendations."

\* cited by examiner

STRATEGIES FOR DETERMINING THE VALUE OF ADVERTISEMENTS USING RANDOMIZED PERFORMANCE ESTIMATES

CROSS-REFERENCE TO RELATED APPLICATION

The present application is related to co-pending U.S. patent application Ser. No. 11/263,538, entitled "STRATEGIES FOR DETERMINING THE VALUE OF ADVERTISEMENTS USING DATA MINING TOOLS," and U.S. patent application Ser. No. 11/263,552, entitled "STRATEGIES FOR SELECTING MODELS FOR USE IN DETERMINING THE VALUE OF ADVERTISEMENTS." These two applications were filed on the same date as the instant application, and are incorporated by reference herein in their entireties.

TECHNICAL FIELD

This subject matter generally relates to electronic advertising strategies. In a more particular exemplary implementation, this subject matter relates to strategies for determining the expected value of advertisements in an online environment.

BACKGROUND

The Internet provides a powerful platform for advertising assets (e.g., products, services, informational resources, etc.). Accordingly, a number of advertising strategies have been developed to disseminate advertisements over the Internet and to manage the users' responses to these advertisements. As used herein, an "advertiser" refers to any entity that sponsors advertisements. A "publisher" refers to any entity which actually disseminates (e.g., publishes) the advertisements to an end-user. An "ad network" refers to an optional entity which supplies advertisements to the publisher and performs various analyses with respect to the advertisements. An "end-user" (or just "user") is any entity which consumes the advertisements provided by the publisher.

In one well known advertising scenario, the publisher comprises an entity which provides information that can be accessed via an online search engine. In this context, the advertiser can identify one or more keywords associated with its advertisement. The publisher, possibly in conjunction with the ad network, will deliver the advertisement to the user when the user enters a keyword associated with the advertisement. The advertisement commonly takes the form of a "sponsored link." The sponsored link can include textual content pertaining to the advertised asset, intended to capture the interest of the user. When the user activates the sponsored link, the link can redirect the user to a target site (such as an online site provided by the advertiser). That site typically provides additional information regarding the asset, and may give the user the opportunity to purchase the asset or take some other action with respect to the asset.

A publisher provides its online services through a collection of user interface presentations that offer a limited amount of space to present advertisements. Hence, to maximize profits, a publisher is encouraged to use this limited "screen real estate" as efficiently as possible. Consider the case in which a total number K of advertisements match an input search term, but the publisher only has enough "screen real estate" to display a number N of the advertisements, where N<K. The publisher (and/or ad network which supplies the advertisements) will therefore attempt to select a subset N of the candidate advertisements K which are likely to produce the greatest profit. A publisher (and/or ad network) which indiscriminately publishes candidate advertisements may stand to lose revenue if one or more of the advertisements exhibit poor revenue-earning performance.

A number of different considerations determine the amount of revenue that an advertisement will produce. One such consideration is the pricing model used to establish the cost of the advertisement to the advertiser (which hence establishes the profit to the publisher and/or ad network). Different pricing models have been proposed in the art. One traditional pricing model uses a cost-per-impression strategy. In this strategy, the advertiser pays a fee every time a browser is presumed to present an advertisement to the user, whether or not the user actually "consumes" the advertisement (e.g., whether or not the user notices the advertisement). For example, a cost-per-thousand (CPM) strategy allows an advertiser to pay a fee for every 1000 impressions. In a cost-per-click (CPC) strategy, the advertiser pays a fee only when the user clicks on the advertisement to activate whatever page is linked to the advertisement. The user's action is referred to as a "click-through" event in art. In a cost-per-action (CPA) strategy, the advertiser pays a fee only when the user performs some explicit action in response to advertisement. In one case, the action may pertain to the purchase of the advertised asset. In another case, the action may correspond to the user's online registration to some program or service.

For the CPC and CPA pricing models, a publisher (and/or ad network) may therefore attempt to identify those advertisements that have the greatest potential effectiveness, meaning those advertisements that are most likely to solicit some kind of active response from the users. A so-called "conversion rate" is one metric used to assess ad effectiveness. The conversion rate determines the percentage of conversion events relative to the number of conversion opportunities presented to the users. For example, the conversion rate in a CPC model is the number of click-through events divided by the total number of times the advertisement is presented to the users (e.g., as defined by the total number of impressions). In this scenario, the conversion rate is also referred to as the click-through rate (CTR). The conversion rate in a CPA model is the number of express actions taken by the users (such as purchases) divided by the total number of times the advertisement is presented to the users (e.g., as defined by the total number of impressions).

However, determining the profit-earning potential (e.g., the "expected value") of advertisements can be a difficult task. For example, when an advertiser wishes to advertise a new asset, the publisher (and/or ad network) may not have sufficient information regarding the conversion rate of such an advertisement. This is particularly true in the CPA model. For example, in a typical application, the click-through conversion rate is often below 5 percent. And out of this small number, only a fraction of users take some action in response to viewing the advertisement. This results in a sales conversion rate that may be only a fraction of 1 percent. Due to these low conversion rates, it may take a relatively long time to collect sufficient performance data to determine the conversion rate. This poses a risk to the publisher (and/or the ad network), as it must decide whether or not to publish the advertisement without having reliable insight as to how the advertisement will perform. As appreciated by the present inventors, if the publisher (and/or ad network) decides to publish a CPA-priced advertisement that performs poorly, the publisher (and/or ad network) may suffer a significant opportunity cost; namely, such a loss can result from the fact that the publisher (and/or ad network) presents an unsuccessful advertisement when it could have presented a more revenue-effective advertisement. But, as likewise appreciated by the present inventors, if the publisher (and/or ad network) takes a too conservative approach to publication, it will never give new advertisements which are truly revenue-effective an opportunity to prove their relative worth.

More generally, even with advertisements that have a history of being published in an online environment, it is difficult for a publisher and/or ad network to discover, extract and meaningfully analyze the performance of these advertisements in order to make effective decisions regarding the expected value of these advertisements. Advertisers cannot necessarily be trusted to provide conversion estimates, as the advertisers may potentially inflate the earning potential of their advertisements to better ensure the publication of these advertisements.

According to another potential problem, it may also be a daunting task for the publisher and/or ad network to select an advertising approach (such as a pricing model) that most effectively maximizes its profit. If the advertiser and/or publisher make a poor choice in advertising approach, these entities may suffer due to poor performance of the advertisements.

Still other deficiencies may exist in the online advertising arts. These deficiencies may impact one or more of the advertisers, ad networks, publishers, end-users, and potentially, the market as a whole.

For at least the above-identified exemplary reasons, there is a need for more satisfactory strategies for conducting advertising in an online environment.

SUMMARY

Strategies are described for conducting an advertising campaign using a cost-per-transaction (CPT) pricing model. In this model, the advertiser is charged when an end-user takes some express action in response to viewing the advertisement, such as by clicking on the advertisement, purchasing the advertised asset, performing a registration procedure, and so forth.

Various solutions allow for the computation of the expected value of a CPT advertisement when there is a scarcity of data pertaining to the actual performance of the CPT advertisement. This is particularly the case for new advertisements that have never been published before.

For instance, a first solution determines the expected value of an advertisement by computing a conversion estimate having a randomized component. The conversion estimate can be computed by forming a probability distribution based on the performance exhibited by the advertisement thus far, and selecting the conversion estimate from this distribution. This technique applies to advertisements that are new (which may have generated a relatively small amount of performance data), as well as advertisements that are more mature (which may have generated ample amounts of performance data). For the particular case of a new advertisement, the first solution can also upwardly offset the probability distribution. One way of accomplishing this result is by artificially elevating one or more parameters used to form (or otherwise characterize) the probability distribution (such as, but not limited to, the mean of the probability distribution). This results in artificially boosting the expected value of the advertisement. This result, in turn, better ensures that the new advertisement will be included in the top-ranking N advertisements to be published. Artificially boosting a new advertisement in this manner is desirable, as it prevents more mature advertisements with proven profitability from "starving out" new advertisements. The upward offset gives the new advertisements a chance to prove their worth vis-à-vis more mature advertisements.

A second solution mines a data store to extract a group of information that can be applied to the computation of expected value of a new advertisement. The extracted group of information is selected to have some bearing on the characteristics of the new advertisement. Exemplary groupings include: advertiser-related groupings; industry-related groupings, seasonality-related groupings, and so forth. The expected value of the new advertisement can then be inferred from the group of information, even though there may be insufficient data that is directly relevant to the performance of the new advertisement itself. In another implementation, the expected value for the new advertisement can be formed, at least in part, by analyzing the popularity of one or more online sites associated with the new advertisement.

A third solution transitions among different pricing models, such as the CPM and CPT pricing models. In this technique, an ad network can initially publish a new advertisement as either a CPM advertisement or a trial-mode CPT advertisement. For the CPT advertisement, at the end of the trial mode, a decision is made as to whether the advertisement is sufficiently successful to be placed in a normal CPT mode. If not, then the advertiser is given various choices. According to one choice, the advertiser is allowed to continue publishing the advertisement in the CPT mode, but the advertiser is asked to compensate the ad network for whatever opportunity cost it suffers on account of publishing the less-than-optimally-successful advertisement.

Still further features and attendant benefits of the strategies will be set forth below.

The subject matter set forth in this Summary section refers to exemplary manifestations of the invention, and hence does not limit the scope of the invention set forth in the Claims section. More specifically, the Claims section may set forth aspects of the invention which are broader in scope than the concepts described in this Summary section.

Figure 1:
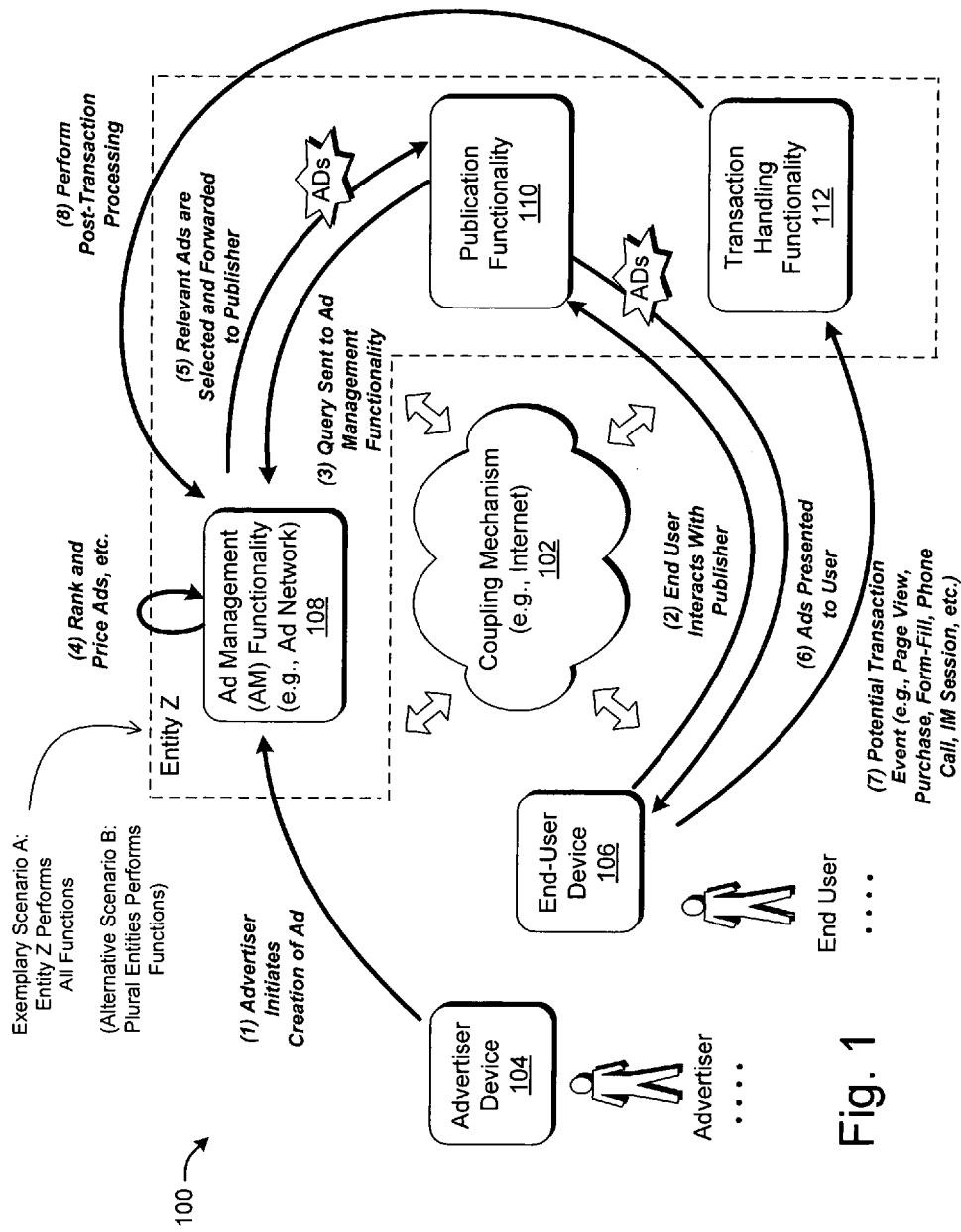
FIG. 1 shows an exemplary system for conducting advertising in an online environment.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth strategies for conducting various aspects of an online advertising program. For instance, this disclosure describes various strategies for determining the expected values of advertisements and ranking the advertisements based on their expected values.

As a preliminary matter, the term "asset" (or "item") pertains to any kind of tangible or intangible resource, such a product, a service, an informational resource, and so forth.

The term "advertiser" refers to any entity that sponsors advertisements, e.g., an entity that creates and pays for the advertisements.

The term "publisher" refers to any entity which actually disseminates (e.g., publishes) the advertisements to an end-user.

The term "ad network" refers to any entity which supplies advertisements to the publisher and performs various analyses with respect to the advertisements.

The term "end-user" (or just "user") refers to any entity which consumes the advertisements provided by the publisher.

The term "advertisement" itself refers to any information imparted to an end-user which encourages the user to take some action, with any commercial or non-commercial objective in mind. In the context most commonly evoked by this discussion, an advertisement may prompt a user to purchase some kind of asset, such as a product, service, etc. But an advertisement can also impart "non-commercial" information that encourages the user to support a political cause, change his or her eating habits, and so forth. In this context, the advertised "asset" can refer to the end result that the message attempts to solicit, of any nature.

The term "cost-per-transaction" (CPT) refers to a pricing model in which the cost of an advertisement is assessed as a function of any kind of express action (e.g., "transaction") taken by a user in response to the advertisement. In one case, the transaction may pertain to the purchase of the advertised asset by the user. In another case, the transaction may pertain to filling out a form, such as a registration form, any kind of application form (such as an insurance-related form), and so forth. In another case, the transaction may just pertain to the activation of an advertisement which invokes the display of information (e.g., a "page view") pertaining to the advertised asset. Still other kinds of transactions are encompassed by the CPT model (as will be set forth in greater detail below). Thus, the CPT model is intended as a general concept which encompasses both the cost-per-click (CPC) model and the cost-per-action (CPA) model described in the Background section.

The term "conversion rate" determines the percentage of conversion events relative to the number of conversion opportunities presented to the users. For example, the conversion rate in a CPC model is the number of click-through events divided by the total number of times the advertisement is presented to the users (e.g., as defined by the total number of advertisement impressions). For this case, the conversion rate is also referred to as the "click-through rate" (CTR). The conversion rate in a CPA model is the number of express actions taken by the users (such as purchases) divided by the total number of times the advertisement is presented to the users (e.g., as defined by the total number of advertisement impressions).

The terms "logic, "module" or "functionality" as used herein generally represent hardware, software or a combination of hardware and software, or some other kind of implementation. For instance, in the case of a software implementation, the term "logic," "module," or "functionality" represents program code that performs specified tasks when executed on a processing device or devices (e.g., CPU or CPUs). The program code can be stored in one or more computer readable memory devices.

This disclosure includes the following sections.
A. Overview of the System
 A.1. Exemplary Ad Analysis and Publication Environment (FIG. 1)
 A.2. Exemplary Computer Equipment for Use within Environment (FIG. 2)
 A.3. Exemplary User Interface Presentation (FIG. 3)
B. The Ad Management Functionality
 B.1. Overview of the Ad Management Functionality (FIG. 4)
 B.2. Exemplary Manner of Operation of the Ad Management Functionality (FIG. 5)
 B.3. Overview of Challenges in the Computation of Expected Value
 (FIG. 6)
C. Exemplary Ad Ranking Strategies (FIGS. 7-9)
D. Exemplary Ad Aggregation Strategies (FIGS. 10 and 11)
E. Exemplary Pricing Model Selection Strategies (FIGS. 12-14)
A. Overview of the System
 A.1. Exemplary Ad Analysis and Publication Environment (FIG. 1)

FIG. 1 presents an overview of an exemplary system 100 for conducting online advertising. In the implementation featured in this disclosure, the online environment pertains to the Internet or other wide area network (WAN). However, the techniques and tools described herein can also be applied to other network environments. In addition, the techniques and tools described herein can be applied to environments in which one or more steps are performed in manual fashion. For example, an advertisement can be published by disseminating the advertisement to users via regular mail instead of a digital network.

The system 100 generally shows a plurality of entities which interact with each other via a coupling mechanism 102. A first entity comprises an advertiser who interacts with the system 100 via an advertiser device 104. The advertiser initiates the creation of an advertisement, e.g., in one case, to sell one of its assets. A second entity comprises an end-user (or just "user" below) who interacts with the system 100 via a user device 106. The user consumes the advertisement (by viewing the advertisement and potentially taking an action in response to the advertisement). A third entity comprises ad management (AM) functionality 108. The AM functionality 108 performs all aspects of ad management, including computing the expected value of the advertisement, ranking the advertisement with respect to other advertisements at the time of ad presentation, pricing the advertisement, tracking the performance of the advertisement, and so forth. (The AM functionality 108 is synonymously referred to herein as an ad network.) A fourth entity comprises ad publication functionality 110. The ad publication functionality 110 disseminates the advertisement selected by the AM functionality 108 to the user via the coupling mechanism 102. A fifth entity comprises ad transaction-handling functionality 112. The ad transaction-handling functionality 112 implements operations that are invoked when the user activates an advertisement presented by the ad publication functionality 110. For example, the ad transaction-handling functionality 112 handles the purchase of an asset if the user opts to purchase an advertised asset. Or the ad transaction-handling functionality 112 implements other operations, such as presenting a form to be filled out, presenting a page view in response to a click-through event, and so forth.

FIG. 1 illustrates the functionalities (108, 110, 112) as separate entries to clearly demarcate the roles played by these entities. However, in an actual implementation, these functionalities (108, 110, 112) can be grouped together in any manner. In one example, a single entity Z can implement all three functionalities (108, 110, 112). This scenario corresponds to the case in which a web merchandiser integrates an ad network into its services, wherein the ad network is configured to present advertisements to the merchandiser's users for assets (e.g., books and other articles) offered by the merchandiser itself. In this scenario, because entity Z controls all of the functionalities (108, 110, 112), these functionalities (108, 110, 112) can be integrated and can interact with each other in an efficient manner. For example, through its online merchandising service, entity Z can collect a large historical data store regarding advertiser-related information, industry-related information, user information, and so forth. The AM functionality 108 can rely on this information in estimating the value of advertisements in a manner to be described in further detail below (in Section D below).

In other scenarios, one or more of the functionalities (108, 110, 112) can be implemented by separate entities. For example, in one alternative scenario, a single entity can implement the AM functionality 108 and the ad publication functionality 110. But when the user clicks on an advertisement, the user can be redirected to another site which implements the ad-transaction-handling functionality 112. For instance, the advertiser itself can comprise the entity that implements the ad transaction-handling functionality 112, such that the user is redirected to the advertiser's website when the user activates the advertisement. The user can then purchase the advertised asset through the advertiser's website. In this implementation, the system 100 can provide a tracking mechanism which allows the AM functionality 108 to determine when the user actually purchases an advertised asset (or takes some other prescribed action) while visiting the advertiser's website.

In still another scenario, a first entity can implement the AM functionality 108 and a second entity can implement the publication functionality 110. In this case, the publication functionality 110 can request the AM functionality 108 to supply a list of N advertisements that are tailored to a user's current interaction with the publication functionality 110 (e.g., based on a query submitted by the user, a page being viewed by the user, and other potential factors). The AM functionality 108 computes the list of N advertisements (in the manner to be described below) and forwards this list to the publication functionality 110. The publication functionality 110 then disseminates these N advertisements to the user.

The above-described functionality-grouping scenarios are non-exhaustive. There are other ways to allocate the functions performed by the system 100 to different actors in the system 100. Further, the separate functions performed by any functionality (108, 110, 112) can be broken down further and implemented by multiple entities. For example, in the case of the AM functionality 108, its various functions can be performed by separate entities, possibly administered by separate commercial actors.

The head-end functionalities (108, 110, 112) can be implemented in different ways. In one case, each functionality can be implemented by one or more server computers and associated data stores (and/or other electronic equipment). For instance, any of the head-end functionalities (108, 110, 112) can include a front-end server coupled to various back-end processing engines, in associated with one or more associated data stores. The front-end server can be made accessible to external entities via a web address.

The devices (104, 106) also can be implemented in different ways. In one case, the devices (104, 106) can correspond to any kind of electronic processing devices, such as fixed computer workstations, portable or wearable computers (such as laptop computers), mobile telephones, personal digital assistant (PDA) devices, game consoles, set-top boxes, computer-equipped appliances of any variety, and so forth.

Figure 2:
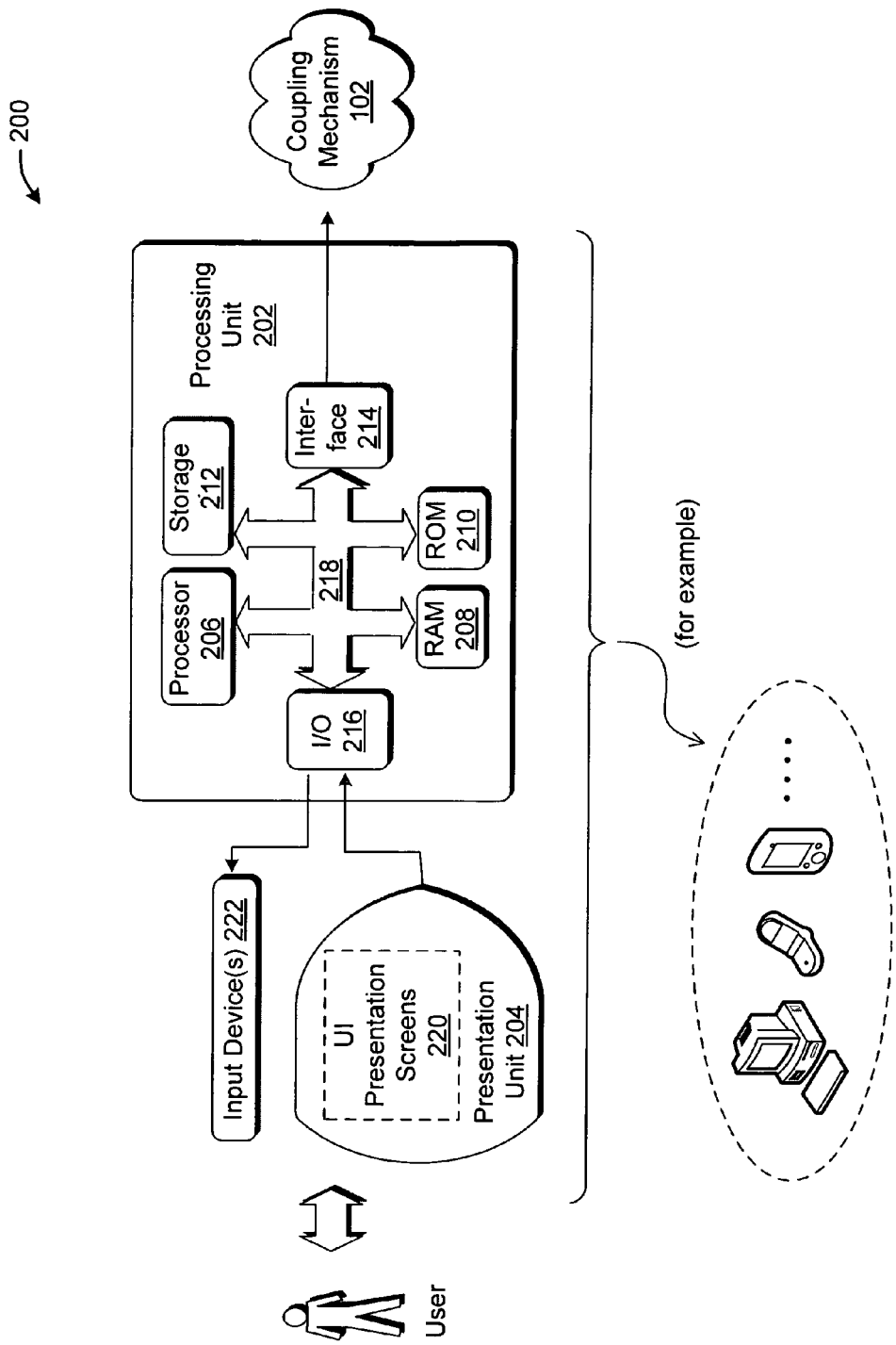
FIG. 2 shows an exemplary architecture of a processing device that can interact with the system of FIG. 1.

FIG. 2 (discussed below) shows the exemplary architecture of a processing device that can serve the role any of the server computers associated with the functionalities (108, 110, 112), as well either of the advertiser or user devices (104, 106).

The coupling mechanism 102 can correspond to any kind of communication conduit or combination of communication conduits for exchanging information between the entities in the system 100. In the case most commonly evoked case in this disclosure, the coupling mechanism 102 corresponds to a wide area network, such as the Internet. However, the coupling mechanism 102 can alternatively, or in addition, comprise other kinds of communication conduits, such as an intranet, a point-to-point coupling arrangement, and so forth. In any case, the coupling mechanism 102 can include any combination of hardwired links, wireless links, routers, repeaters, gateways, name servers, and so forth (not shown), governed by any protocol or combination of protocols (e.g., TCP, IP, HTML, and so forth).

FIG. 1 includes numbered arrows (i.e., arrows (1)-(8)) which illustrate a general flow of operations in the system 100 according to one exemplary implementation. An overview of these operations is presented in this section. Later sections provide further details regarding each of these operations.

To begin with, considered as a whole, the illustrated operations implement a cost-per-transaction (CPT) method for conducting an advertising campaign (in possible conjunction with other pricing strategies, such as CPM). The CPT method determines the cost of an advertisement based on the volume of transaction events prompted by the advertisement. The following non-limiting list enumerates exemplary kinds of transactions that are encompassed by the CPT model:

In one case, a transaction pertains to the sale of an advertised asset.

In another case, a transaction pertains to a form-filling event prompted by the advertisement.

In another case, a transaction pertains to the presentation of a page view in response to a user clicking on the advertisement (or in response to the user taking some other action). This event is the same as a click-through event, and thus the CPT model can be said to represent a general model that encompasses the CPC model as one of its species. In a more specific implementation of the page view-type category of transaction, a user is considered to have consummated a transaction when the user reaches a specific web page, not but necessarily the web page that is directly linked to the sponsored link.

In another case, a transaction pertains to completing a verifiable registration process (e.g., using an E-mail-based validation process, an SMS-based validation process, and so forth.)

In another case, a transaction pertains to placing or receiving a phone call (e.g., to a representative of the entity that sponsors the advertisement).

In another case, a transaction pertains to engaging in an instant-messaging (IM) chat session (e.g., a web-based chat session, an IM-based chat session, and so forth).

Again, this list is representative, rather than exhaustive of the possible manifestations that a transaction might take. In any event, broadly stated, a "conversion rate" defines the ratio of transactions to the total number of presentations of the advertisement. For example, if a pool of users click on an advertisement 30 times after being shown the advertisement 1000 times, then the click-through conversion rate (CTR) is 30/1000, or 0.03. If these click-through events only result in the purchase of 3 assets, then the purchase-related conversion rate is 3/1000 or 0.003.

Operation (1)

In operation (1), the advertiser sends instructions to the AM functionality 108 to define an advertisement for publication. This operation can be performed in different ways. In one technique, the advertiser can create an advertisement in manual fashion using an offline authoring tool, after which the advertiser can transfer the advertisement information to the AM functionality 108. Or the advertiser can create the advertisement in manual fashion via an online dialog with the AM functionality 108 through a suitable user interface provided by the AM functionality 108. Or the advertiser can upload multiple advertisements to the AM functionality 108 at the same time. Still other techniques for defining advertisements are possible.

In any event, the advertiser specifies an advertisement by defining its salient properties. Exemplary salient information can include: the text of the advertisement message (referred to as the ad's "creative"); one or more keywords that are used to invoke the publication of the advertisement (if this mode of publication is being used); a definition of the events that will be triggered when the user activates the advertisement, and so forth. As to keyword matching, the user can also specify the conditions that constitute a match, such by specifying one of the well-known match categories of "exact," "phrase," and "broad." An exact match occurs when an end-user enters key terms which strictly match the content and placement of key terms specified by the advertiser. A phrase match occurs when an end-user enters key terms which match the content and placement of key terms specified by the advertiser, even though the user's key terms may also include additional terms that are not specified by the advertisement. A broad match occurs when an end-user enters key terms which are also specified, in any order, by the advertiser. The match category is also referred to as the "match type" herein.

The instructions may also specify pricing information associated with the advertisement. One piece of pricing information may convey price-limit information, such as the maximum amount of financial resources that the advertiser is willing to spend in a campaign for a particular advertisement. This allows, in part, the advertiser to bid for advertising space in the manner of an online auction. In one implementation, an advertiser can bid on individual keywords. For example, assume that an advertiser wishes to create an advertisement for a raincoat. The advertiser may specify a keyword of "raincoat," coupled with one of: (a) a maximum amount of money that the advertiser is willing to pay when the advertisement for a raincoat is simply displayed (an impression event); (b) or the maximum amount of money that the advertiser is willing to pay when the user clicks on the advertisement (a click-through event); or (c) the maximum amount of money that the advertiser is willing to pay when the user actually performs a non-click-type transaction prompted by the advertisement (e.g., a sales event), and so forth. As will be discussed in Section C, the competitiveness of this advertisement vis-à-vis other advertisements that adopt the same keyword ("raincoat") is gauged by the estimated performance of this advertisement (such as the estimated click-through rate of the advertisement), in conjunction with the bid amount. In another implementation, the advertiser can pay a fixed fee for one or more keywords.

In another implementation, the advertiser can bid an amount that is a function of the sales price of an asset that is being purchased. This amount is called the "rev share" amount herein. For example, the advertiser can specify that the rev share amount is a percentage of the total purchase price of the asset. By way of comparison, pricing an advertisement based on an impression event or a click-through event is potentially less complex than pricing an advertisement based on a revenue-based costing strategy. This is because impression-based or click-through-based costing strategies can define the price of an advertisement at the time of impression (e.g., when an ad is displayed to a user), without requiring special access to sales information. Sales information may be more difficult to obtain because it is transaction-dependent information that is not necessarily known (or readily available) to the AM functionality 108.

The instructions may also optionally specify the pricing model that should be applied to the advertisement. For example, the advertiser may select a cost-per-impression (CPM) model to apply to the advertising campaign. Or the advertiser may select a cost-per-transaction (CPT) model to apply to the advertising campaign. Moreover, for the CPT model, the system 100 may permit the user to specify exactly what kind of transaction constitutes a cost-accruing triggering event, such a click-through event, a sales event, a form-filling event, a registration event, and so forth, or some combination thereof. Still other pricing models can be manually specified by the advertiser.

Alternatively, or in addition, the AM functionality 108 can automatically determine one or more of the characteristics of the advertisement on behalf of the advertiser. This reduces the need for the advertiser to perform independent analysis to determine certain characteristics of the advertisement. For example, the AM functionality 108 can perform analysis to select keywords that will trigger the presentation of the advertisement. Also, as will be discussed in Section E below, the AM functionality 108 can automatically select the pricing model that will be applied to the advertisement. For example, the AM functionality 108 can initially place a new advertisement in a trial mode in which the AM functionality 108 collects data regarding how well the advertisement is performing. Such performance data can comprise impression rate (RPM) information, click-through rate (CTR) information, or some other metric. If the advertisement meets a specified performance threshold (to be defined below), then the AM functionality 108 can subsequently apply the CPT pricing model to the advertisement in a normal mode (rather than a trial mode). If the advertisement does not meet this threshold, the AM functionality 108 can: (a) apply a CPM model to the advertisement; or (b) allow the user to compensate for a poorly-performing advertisement by paying the opportunity cost incurred by the AM functionality 108; or (c) de-activate the advertisement so that it is no longer published using any pricing model. In any event, upon receipt of the instructions from the advertiser, the AM functionality 108 can store the advertisements in a data store in preparation for the advertisements' publication upon the occurrence of triggering events.

Operation (2)

In operation (2), a user can access the publication functionality 110 via the user device 106 to obtain information supplied by the publication functionality 110. This interface can take numerous different forms associated with many different kinds of application environments. For example, operation (2) can allow the user to access information by browsing through a website hosted by the publication functionality 110. In doing so, the user can manually enter various input information, such as one or more search terms. The user may also manually enter other instructions to obtain information, such as by clicking on various links, menu items, buttons, sliders, etc. provided by the publication functionality 110's website. In addition to these kinds of manually-specified input instructions, the user device 106 (or other entity within the system 100) can automatically forward other parameters that are pertinent to the user's query, such as: location information regarding the geographic location of the user; language information associated with the user's natural language, and so forth. Collectively, the information associated with the query defines the context of the user's current interaction with the publication functionality 110.

Operation (3)

In operation (3), the publication functionality 110 forwards the user's query terms (and other parameters) to the AM functionality 108. The purpose of this transfer is to request the AM functionality 108 to process the query to select a group of N advertisements that are relevant to the query. As described above, in one case, the AM functionality 108 and the publication functionality 110 are implemented by the same entity Z. In this case, the transfer of query information in operation (3) can represent an intra-site transfer of information. In another case, the AM functionality 108 and the publication functionality 110 are implemented by two separate commercial entities. In this case, the transfer of query information in operation (3) can represent an inter-site transfer of information, e.g., between separate web sites.

Operation (4)

In operation (4), the AM functionality 108 receives the query sent in operation (3), and, in response, selects a set of N advertisements which are considered most germane to the query. The AM functionality 108 performs this selection operation because the publishing functionality 110 typically provides limited screen "real estate" in which to present advertisements to its users. As such, this display space might only accommodate the presentation of a limited number of advertisements at any one time, requiring the AM functionality 108 to exercise discretion in deciding which advertisements to publish.

The AM functionality 108 selects the set of N advertisements in the manner set forth in detail in Section C (below). By way of preview, the AM functionality 108 first determines the expected value of a set of K candidate advertisements (where K may be greater than N). The expected value of an advertisement defines, for example, the maximum amount of money that an advertisement is projected to earn (for the ad network) during a defined reporting interval. Next, the AM functionality 108 ranks the advertisements from most profitable to least profitable based on their associated calculated expected values, and then selects the top (most profitable) N advertisements.

Operation (4) may also involve the calculation of the respective costs of the N advertisements. This operation defines the costs that are actually charged to the respective advertisers when cost-accruing events occur (as opposed to the theoretical expected values of the advertisements, which, as stated, may pertain to a maximum amount of money that an advertisement is expected to earn, not necessarily the most likely amount of money that an advertisement is expected to earn). Generally, the costing strategies may differ in terms of: (a) the event that is used to trigger a cost-accrual operation; (b) the financial basis that is used to assess the cost charged to the advertiser; (c) the timing at which the cost is computed; and (d) the timing at which the advertiser is charged, and so forth.

For example, as to timing issues, assume that a cost-per-impression (CPM) strategy is being used. In this model, a cost-accruing event associated with an advertisement is simply the display of the advertisement by the user's browser. In this case, the AM functionality 108 can both calculate the cost of the advertisement and actually charge the advertiser during operation (4), as the advertisement is about to be presented to the user at this stage.

Assume next that a CPT strategy is being used. In this model, the cost-accruing event is the user's performance of some express action associated with the advertisement. In those cases in which the cost of each CPT transaction is definable in advance (e.g., based on an advertiser-specified maximum CPC amount), then the AM functionality 108 can potentially calculate the cost of the advertisement during operation (4). However, in this case, the operation of charging the advertiser needs to be deferred until the user actual performs the cost-accruing event. In other cases, the cost of each CPT transaction may not be readily definable in advance. For instance, in one such situation, the cost of a transaction can be defined as a share of the revenue of a sales transaction (i.e., a rev share amount). In this case, the AM functionality 108 may need to defer both the cost-calculation and charging operations to a later stage when the information necessary to perform these operations has been defined.

Section C provides more information regarding exemplary costing strategies that can be used to implement operation (4).

Operation (5)

In operation (5), the AM functionality 108 transfers the selected list of N advertisements to the publication functionality 110 for dissemination to the user. The AM functionality 108 can transfer the list of N advertisements in various ways. In one technique, the AM functionality 108 can transfer an XML file which contains information that specifies the advertisements to be displayed. In one case, the AM functionality 108 can supply the full content of the advertisements to the publication functionality 110. In another case, the AM functionality 108 can merely specify reference information that identifies the advertisements, upon which the publication functionality 110 accesses the advertisements based on the reference information. For instance, the publication functionality 110 can potentially maintain a local store that includes the contents of the advertisements; the publication functionality 110 can use the reference information to access the advertisements from its local store.

Operation (6)

In operation (6), the publication functionality 110 transfers the selected set of N advertisements to the user device 106. These advertisements are then presented by the user's browser to the user in a well-known manner (as will be discussed in the context of FIG. 3 below).

Operation (7)

In operation (7), the user can optionally take some action in response to the presented advertisements. This action defines a transaction. The above-described types of possible transactions include (but are not limited to): (a) clicking on a link to activate a page view; (b) initiating a sales transaction; (c) filling out a form; (d) initiating a registration procedure; (e) placing a phone call; (f) initiating an IM chat session, and so forth.

As explained above, the logic and equipment which implements any kind of transaction-handling procedure is defined in FIG. 1 as the transaction handling functionality 112. For instance, the transaction handling functionality 112 may represent a website implemented by a merchant which allows the user to purchase an asset associated with one of the N displayed advertisements.

Operation (8)

In operation (8), performance data is collected and fed back to the AM functionality 108. The performance data reflects how well an advertisement has performed in a defined reporting interval. For example, the performance data may take the form of an advertisement's number of impressions, click-through rate, sales-related conversion rate, and so forth. Upon receipt, the AM functionality 108 performs various post-transaction processing based on the performance data. For example, the AM functionality 108 can use the collected performance data to improve its next computation of expected value for the advertisement under consideration, to modify its selection of pricing model applied to the advertisement, and so forth. Considered as a whole, the series of operations (1)-(8) define a dynamically-changing and evolving procedure in which: (a) advertisements are continually added and removed from the system 100; (b) new performance data is collected and analyzed; (c) decisions are made and revised as to what pricing models should be applied to the advertisements; (d) advertisers are charged in response to cost-accruing events, and so on. In one implementation, these operations can be performed in discrete cycles (such as, for example, every five minutes). At the end of a cycle, the system 100 performs various backend processing to handle the above-descried operations.

A.2. Exemplary Computer Equipment for Use within Environment (FIG. 2)

FIG. 2 shows an exemplary architecture of representative device 200 that can interact with the system 100 shown in FIG. 1. In one case, the device 200 may correspond to the advertiser device 104, the end-user device 106, or some other user device. In this context, the device 200 can represent any kind of electrical processing device (e.g., PDA, mobile telephone, game console, and so forth) for interacting with the system 100 via the coupling mechanism 102. In another case, the device 200 may correspond to a server computer which can be employed by any head-end entity shown in FIG. 1, such as the AM functionality 108, the ad publication functionality 110, and the ad transaction-handling functionality 112.

In any case, the device 200 generally includes a processing unit 202 and a presentation unit 204. The processing unit 202 corresponds to any kind of mechanism for processing information. The presentation unit 204 corresponds to any kind of mechanism for presenting output generated by the processing unit 202. The processing unit 202 is communicatively coupled to the presentation unit 204.

More specifically, the processing unit 202 can comprise one or more processing components 206 (such as a CPU, neural network, etc.), RAM 208, RAM 210, media components 212 (such as a hard drive, DVD drive, etc.), network interface 214 (such as a telephone or cable modem, broadband connectivity mechanism, etc.), and an I/O interface 216 for interacting with input devices and output devices. One or more buses 218 couple the above-described components together. The output devices can include the presentation unit 204, which presents a graphical user interface 220. The input devices 222 can include any one or more of a keyboard, mouse input device, track ball input device, joystick input device, and so forth.

The various functions described herein can be implemented by logic functionality, which can represent machine-readable code stored in any kind of store, as executed by any kind of processing device. Or the logic functionality can represent discrete logic circuitry, or some combination of software and discrete logic circuitry, or yet some other form of implementation.

A.3. Exemplary User Interface Presentation (FIG. 3)

Figure 3:
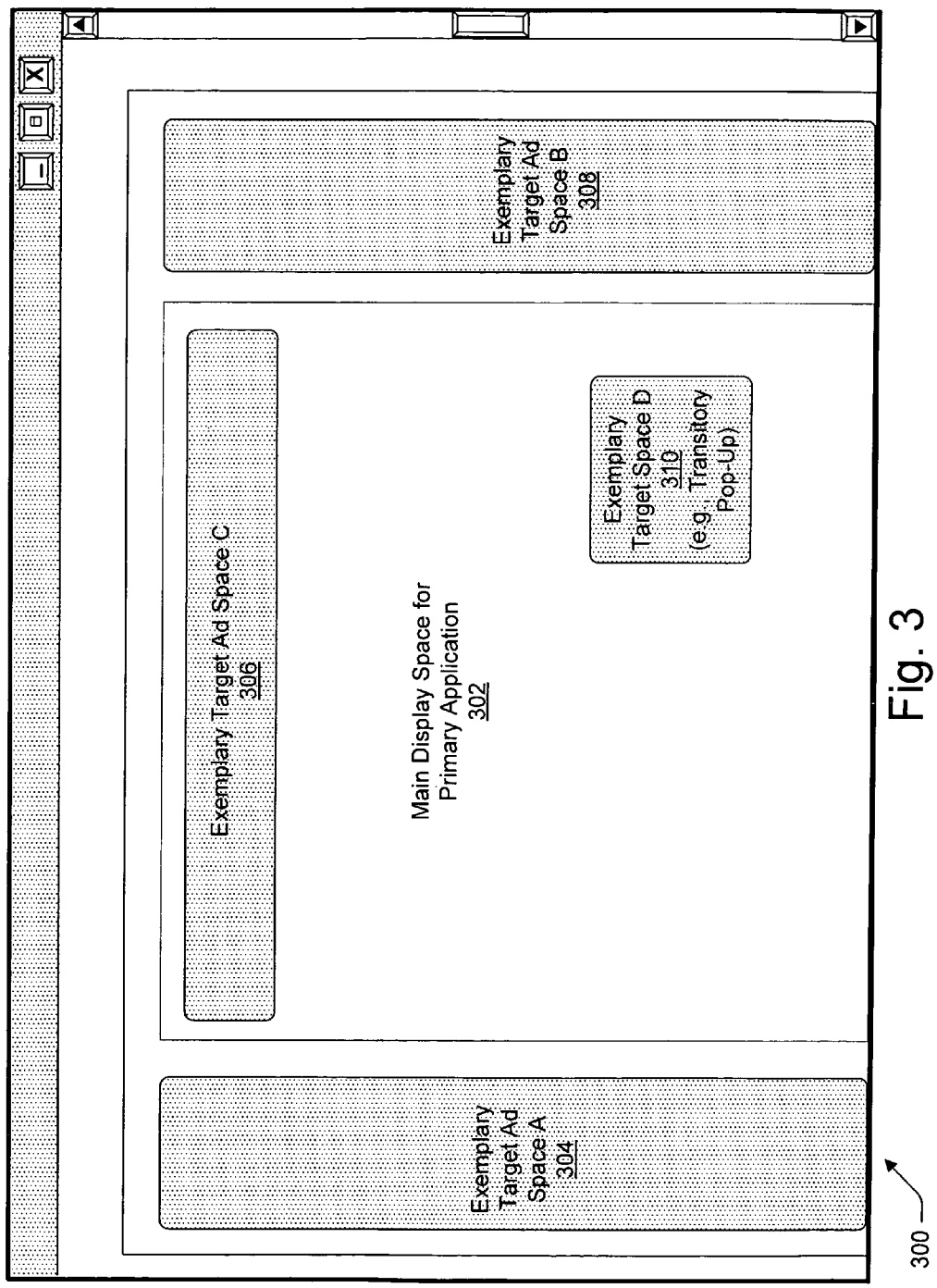
FIG. 3 shows an exemplary user interface presentation that can present advertisements to an end-user using the system shown in FIG. 1.

FIG. 3 shows an entirely exemplary approach to displaying advertisements on the user interface presentation 220 of the presentation unit 204. The user interface presentation 220 includes a main space 302 for displaying the primary content associated with a main-purpose application. For example, assume that a user accesses a search engine module to perform a search. The search engine module constitutes a main-purpose application that generates a list of search results and presents these results to the user in the main display space 302.

The ad publication functionality 110 can publish the advertisements in known fashion such that they appear in the border regions of the user interface presentation 300, such as in regions defined by marginal spaces 304, 306, and/or 308. In addition, or alternatively, the ad publication functionality 110 can present one or more advertisements as pop-up presentations, such as pop-up presentation 310. A pop-up presentation appears for a short period of time and then disappears (either automatically or in response to the user's actions). The layout of objects in the user interface presentation 220 is merely exemplary; other methods for presenting advertisements are possible, such as by formatting an advertisement as a semi-transparent object which overlays all or part of the main display space 302. More specifically, an ad-related website published by Google.com of Mountain View, Calif., identifies the following exemplary types of ad formats, any of which can be used to present advertisements in the context of the present system 100: banner ads, expandable banner ads, beyond-the-banner ads, button ads, skyscraper ads, pop-up ads, shoskeles ads, interstitial ads, daughter window ads, click-down ads, floating ads, animated ads, jump page ads, and content integration ads.

The advertisement itself can include any type of activation mechanism (which enables the user to interact with the ad). In a common case, the advertisement can include hypertext links embedded therein (not shown). Activation of these links prompts the ad transaction-handling functionality 112 to perform whatever action is triggered by the links. In a first case, activation of a link prompts the ad transaction-handling functionality 112 to present a purchase page which allows the user to purchase the advertised asset. In a second case, activation of the link prompts the ad transaction-handling functionality 112 to present a form that should be filled out by the user. In a third case, activation of the link prompts the ad transaction-handling functionality 112 to simply display a page view associated with the advertised asset, and so forth.

To repeat, the user interface presentation 220 illustrates merely one of many ways that advertisements can be presented to users.

B. The Ad Management Functionality

B.1. Overview of the Ad Management Functionality (FIG. 4)

Figure 4:
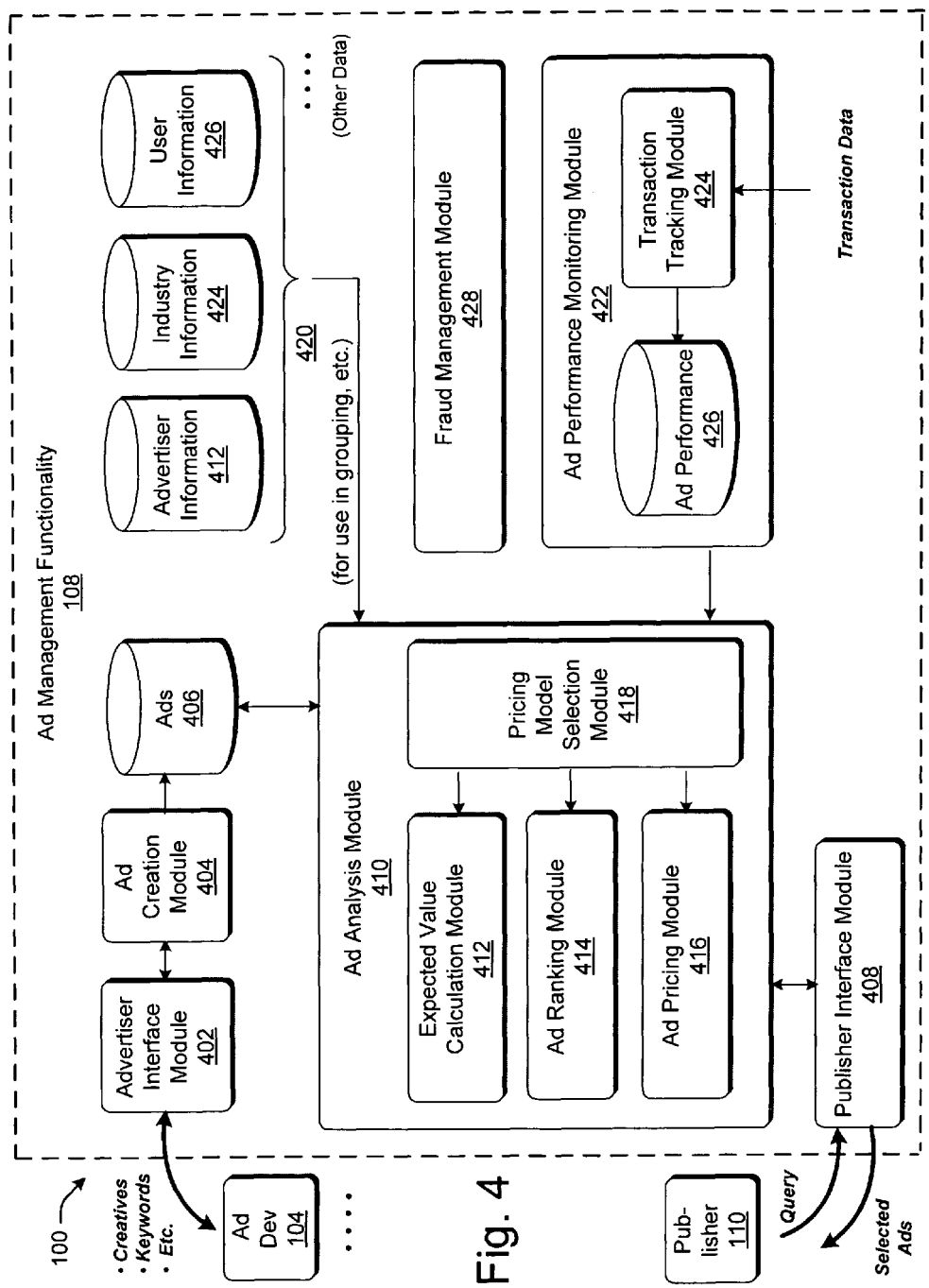
FIG. 4 shows a more detailed view of ad management functionality used in the system of FIG. 1.

FIG. 4 shows a more detailed depiction of the ad management (AM) functionality 108 introduced in the context of FIG. 1. The various modules shown in FIG. 4 can be implemented at a single site or can be implemented at multiple sites in distributed fashion. As described in the preceding section, aspects of the AM functionality 108 can be implemented by one or more server computers in conjunction with one or more data stores, as well as other equipment.

Each of the modules shown in FIG. 4 will be identified below in turn. Later sections provide yet more details regarding certain modules shown in FIG. 4.

To begin with, an advertiser interface module 402 serves as an interface between the AM functionality 108 and one or more advertisers, such as advertiser device 104. For example, this interface module 402 may represent user interface functionality implemented by one or more front-end server computers. The advertiser interface module 402 allows advertisers to either transfer already created advertisements to the AM functionality 108, or to dynamically create the advertisements through interaction with the advertiser interface module 402. In any event, exemplary information that can be used to define an advertisement can include (but is not limited to): (a) the advertisement's textual creative; (b) keywords and match type information that defines the conditions in which the advertisement is published; (c) bidding limit information, and so forth.

An ad creation module 404 produces new advertisements based on instructions received via the advertiser interface module 402. In one case, the ad creation module 404 simply acts as an intermediary that receives and registers already created advertisements supplied by the advertiser interface module 402. In another case, the ad creation module 402 can automatically define one or more aspects of the advertisements based on instructions received by the advertiser interface module 402. For instance, the ad creation module 404 can define one or more keywords used to trigger the presentation of an advertisement in the event that the advertiser itself declines to do so.

An ad store 406 serves as a repository of created advertisements. Database management functionality (not shown) can be used to maintain the ad store 406, e.g., by removing inactive advertisements, and so forth.

A publisher interface module 408 is used to interact with one or more publishers, such as exemplary publication functionality 110. In circumstances in which a single site (and a single commercial entity) implement both the AM functionality 108 and the publication functionality 110, then the publisher interface module 408 can implement the transfer of information between these two functionalities (108, 110) in intra-site fashion. In circumstances in which two separate sites (and possibly two separate commercial entities) implement the AM functionality 108 and the publication functionality 110, then the publisher interface module 408 can implement the transfer of information between these two functionalities (108, 110) in inter-site fashion, such as via the exchange of information over the Internet.

An ad analysis module 410 performs the core of the processing of the AM functionality 108. By way of overview, it receives a user query from the publication functionality 110, and, in response, determines a list of N advertisements that are germane to the query (e.g., because the advertisements match the conditions specified in the query). The ad analysis module 410 can then forward the list of N matching advertisements to the publication functionality 110 via the publisher interface module 108. The publication functionality 110 then disseminates the N advertisements to the user in response to the user's query.

To perform the above-described role, the ad analysis module 410 includes a collection of modules, including an expected value calculation module 412, an ad ranking module 414, an ad pricing module 416, and a pricing model selection module 418. The expected value calculation module 412 computes the expected value of an advertisement, such as the maximum revenue that the advertisement is expected to earn in a given time interval. The ad ranking module 414 ranks the advertisement vis-à-vis other advertisements based on the expected values computed by the expected value calculation module 412. The ad pricing module 416 determines the actual cost that should be charged (to the advertiser) in response to a cost-accruing event associated with the advertisement. The optional pricing module selection module 418 defines a pricing model that should be used to define the pricing strategy that governs the operation of the expected value calculation module 412, ad ranking module 410, and ad pricing module 416. Later sections provide a more detailed explanation of the operation of each of the modules (412-418) provided by the ad analysis module 410.

The AM functionality 108 can also include one or more data stores 420. For example, an exemplary advertiser-related data store 422 can store advertiser information. The advertiser information identifies data regarding prior advertising campaigns conducted by advertisers (such as data regarding the relative success or failure of these advertising campaigns). An exemplary industry-related data store 424 stores industry information. The industry information identifies data regarding prior advertising campaigns in various industries, product categories, and so forth. An exemplary user information data store 426 contains user information. The user information identifies data regarding the prior online behavior of the users who interact with the system 100 as consumers of advertisements. The data stores 420 can include yet other categories of information, such as channel information (pertaining to various channels used to disseminate advertisements in prior advertising campaigns), geographic information (pertaining to the geographical distribution of different prior advertising campaigns), and so forth. The data stores 420 can segment different categories of information into different physical databases, or can divide different categories of information into different record fields within a single database.

The data stores 420 contain salient information which can assist the ad analysis module 410 in computing the expected value of an advertisement. More specifically, as will be explained at length below, in certain circumstances, the ad analysis module 410 will have a dearth of information in which to compute the expected value of a new advertisement (because the new advertisement has accumulated no performance data to indicate whether it is a viable revenue-earning candidate). And even for an advertisement for which some performance data exists, the ad analysis module 410 may lack sufficient information to compute the expected value for this advertisement with a sufficient degree of confidence. In these situations, the ad analysis module 410 can use the information in the data stores 420 to derive a more reliable estimate of expected value. It performs this task by defining a grouping of information in the data stores 420 that is pertinent to an advertisement under consideration, and then applying this grouping of information as a guide in deriving the expected value of the advertisement under consideration.

For example, the advertisement under consideration may pertain to a particular brand of product, such as a ROLEX watch. Although the AM functionality 108 may have never determined the expected value of an advertisement for this brand of watch, it may have previously analyzed advertisements for other high-end watches, such as PATEK PHILLIPE watches. The performance of a PATEK PHILLIPE advertisement likely has some bearing on the performance of a ROLEX advertisement. Thus, the performance of a PATEK advertisement can be used to compute a more reliable expected value for the ROLEX advertisement. The estimate of expected value may further improve in reliability by considering aggregate information associated with the general market for high-end watches, which may include dozens of watch brands.

Section D provides more details regarding the use of the information in the data stores 420 to improve the analysis performed by the ad analysis module 410. Continuing with the description of FIG. 4, an ad performance monitoring (APM) module 422 tracks the performance of an advertisement under consideration. That is, the APM module 422 can track cost-accrual events that occur in the system 100 in response to the presentation of the advertisement to the users. In a CPT model, cost-accrual events may represent click-through events, sales events, form-filling events, and so forth. To function in this manner, the APM module 422 can include a transaction tracking module 424 which performs the actual tracking operation, in association with an ad performance data store 426 which stores the performance data collected by the transaction tracking module 422.

In the case in which the functionalities (108, 110, 112) are all implemented by the same commercial entity, the APM module 422 can rely on intra-site communication to record the occurrence of an impression event or a conversion event. For example, assume that a web merchandiser publishes advertisements for assets that it sells on its own website. In this case, the APM module 422 can record performance data by simply receiving the performance data from the component of the website which implements the sale. In other cases, the AM functionality 108 and the transaction handling functionality 112 may be implemented by two different commercial entities. Here, the tracking module 422 needs to apply more complex tracking mechanisms to record performance data, as the transaction handling functionality 112 may not be under its control. Different techniques can be used to perform inter-site tracking, such as pixel-based beacon tracking techniques, cookie-based technique, and so forth.

Finally, the AM functionality 108 can include a fraud management module 428. The purpose of the fraud management module 428 is to determine the occurrence of fraud committed by various participants of the system, such as a malicious publisher, a malicious advertiser, a malicious end-user, and so forth. The AM functionality 108 can apply various fraud filters to detect telltale signs of these activities, and various fraud-protection features to protect the system 100 against these activities. (However, it should be noted that the task of fraud management is shared by all participants of the system 100. Therefore, for instance, advertisers can also implement safeguards which ensure the integrity of the system 100.)

B.2. Exemplary Manner of Operation of Ad Management Functionality (FIG. 5)

Figure 5:
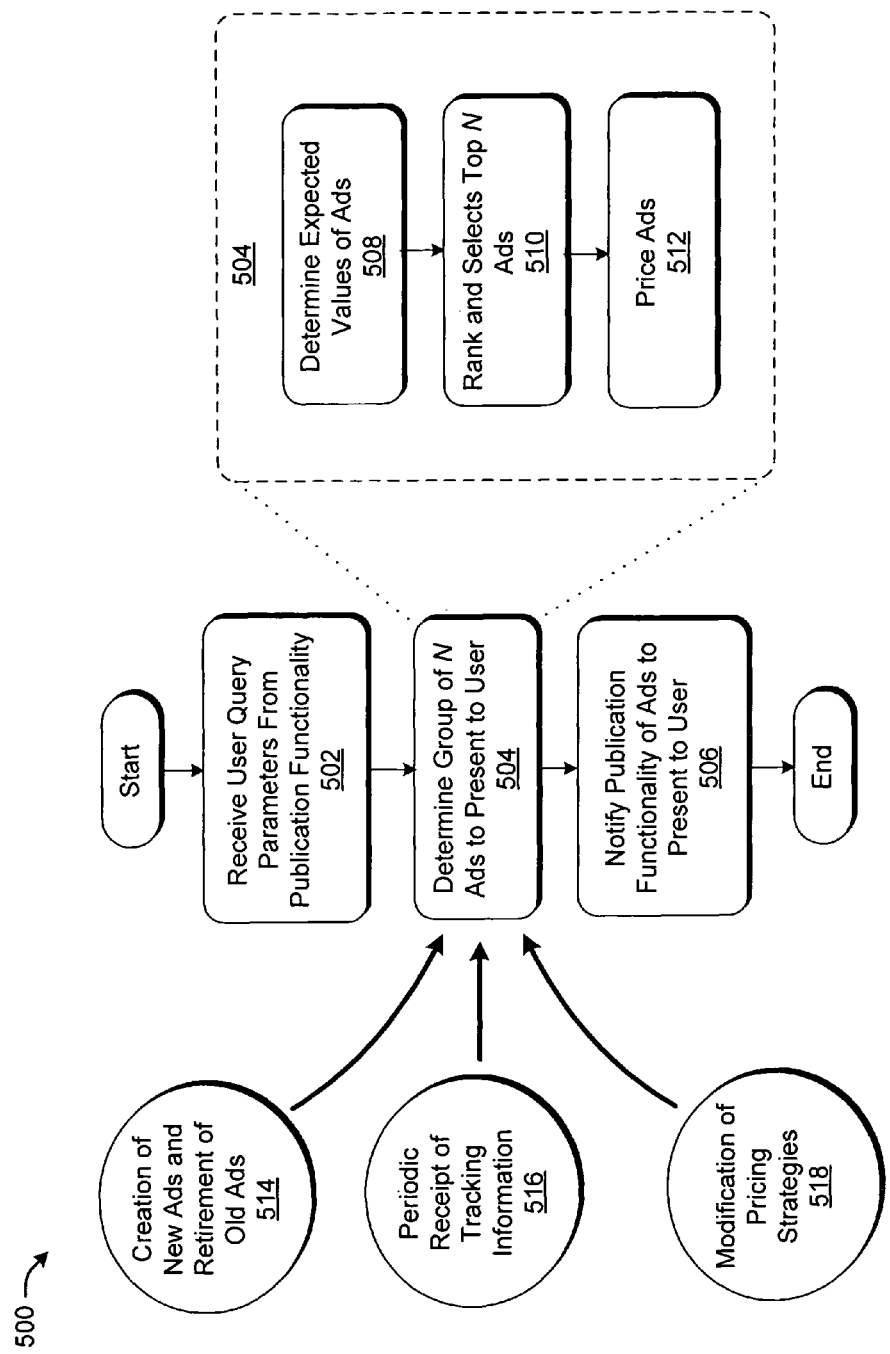
FIG. 5 shows an overview of one exemplary manner of operation of the ad management functionality of FIG. 4.

FIG. 5 shows a procedure 500 which outlines the operation of the AM functionality 108 in flow chart form. To facilitate discussion, certain operations are described in this figure as constituting distinct steps performed in a certain order. Such implementations are exemplary and non-limiting. Certain steps described in this figure can be grouped together and performed in a single operation, and certain steps can be performed in an order that differs from the order shown in FIG. 5. The steps shown in FIG. 5 can be implemented by software, hardware, a combination of software and hardware, or by other technology. (The same prefatory remarks apply to all flowcharts presented in this disclosure).

In step 502, the AM functionality 108 receives a query from the publication functionality 110. As noted above, the query generally defines the context of a user's interaction with the publication functionality 110.

In step 504, the AM functionality 108 determines a group of N advertisements to forward to the publication functionality 110. These N advertisements match the parameters set forth in the query, and are also selected so as to maximize the revenue of the ad network.

In step 506, the AM functionality 108 forwards a list of the N advertisements to the publication functionality 110, whereupon the publication functionality 110 can disseminate these advertisements to the user (in response the user's query).

FIG. 5 also enumerates exemplary operations performed in step 504, involving the selection of the N advertisements.

In step 508, the AM functionality 108 determines the expected values of a set of K candidate advertisements. For instance, the AM functionality 108 can form the expected values by estimating the maximum potential revenue that each of these K advertisements may generate if published.

In step 510, the AM functionality 108 ranks the K advertisements in order of highest-to-lowest expectation values. The AM functionality 108 can then select the top N of the K advertisements. Of course, if $K \leq N$, then the AM functionality 108 can present all of the advertisements without performing any ranking, since there is no need to exclude any of the advertisements. (However, in other implementation, even if $K \leq N$, it may still be preferable to rank the advertisements, so that the publication functionality 110 can display the most profitable advertisements in the most desirable screen locations.)

In step 512, the AM functionality 108 computes the actual prices to be charged to the advertisers upon the occurrence of cost-accrual events associated with the N advertisements. A cost-accrual event may correspond to an impression, a click-through event, a sales event, and so forth.

FIG. 5 also illustrates the dynamic nature of the procedure 500 by showing that various events in the system 100 affect the determination of the N advertisements. Factor 514 represents one such event. Factor 514 corresponds to the introduction of new advertisements to the AM functionality 108, the removal of old (inactive) advertisements from the AM functionality 108, and so forth. This factor affects the determination of the N advertisements because it defines the pool of K advertisements from which the N advertisements are culled.

Factor 516 represents the periodic receipt of new performance data by the AM functionality 108, such as various impression data and various conversion data (e.g., click-through rates, sales rates, and so forth). This factor 518 affects the determination of the N advertisements because the computation of the expected values for the advertisements directly depends, in part, on the observed prior performance of the advertisements.

Factor 518 represents the modification of pricing strategies applied to the advertisements. For example, the AM functionality 108 can vary the pricing model applied to an advertisement based on performance data that has been collected for this advertisement. For example, the AM functionality 108 may initially apply a CPT pricing model to the advertisement, but then switch to a CPM pricing model if the CPT model proves to be unprofitable (as assessed based on the performance data). Factor 518 affects the determination of the N advertisements because its affects the formula used to calculate the advertisements' expected values.

B.3. Overview of Challenges in the Computation of Expected Value (FIG. 6)

As described above, the AM functionality 108 computes the expected values of advertisements based, in part, on the assessed performance of the advertisements. However, some advertisements may not have rich performance histories from which to draw. This is particularly the case for new advertisements that have never been tested in the online marketplace. This may also be true for advertisements that have been published for an extended period of time, but, due to the nature of the markets that these advertisements target and other potential factors, the volume of performance data is relatively meager.

Figure 6:
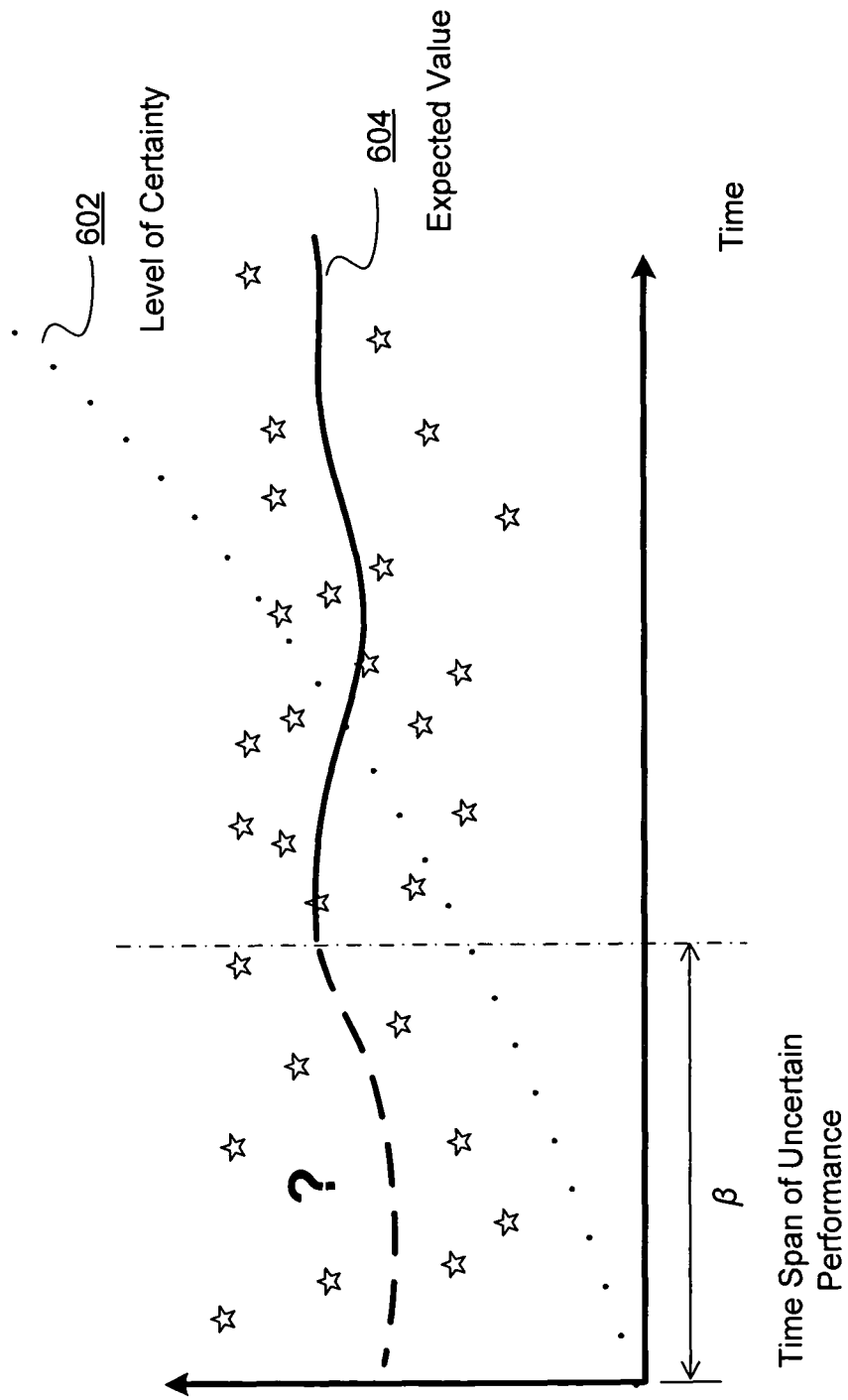
FIG. 6 graphically illustrates the potential difficulty of forming reliable estimates of expected value for new advertisements presented to the ad management functionality of FIG. 4.

FIG. 6 graphically illustrates the above-described concept for an advertisement. This advertisement is introduced to the online marketplace at a time t=0. In this figure, the smattering of stars represents performance data. In general, this performance data represents events that reflect the publication of the advertisement and/or events which reflect user-actions that are invoked by the publication of the advertisement. That is, the performance data may represent impression data, click-through data, sales data, and so forth. At the introduction of the advertisement (at t=0), the AM functionality 108 may have no information regarding the projected success of this advertisement. Moreover, the AM functionality 108 will continue to have insufficient performance data for a period of time following t=0, represented in FIG. 6 as uncertainly interval β. (While this time period of uncertainly does not necessarily have sharp boundaries, to facilitate discussion, FIG. 6 shows this period of uncertainly β as a discrete time interval.)

As time progresses, the ad performance monitoring (APM) module 422 (of FIG. 4) collects additional performance data, resulting in an upward-sloping level of confidence (represented by the dotted line 602 shown in FIG. 6). This upward-sloping level of certainty 602, in turn, allows for the computation of an expected value for the advertisement (represented by line 604 of FIG. 6) with ever-increasing levels of certainty.

Several of the solutions described herein allow the AM functionality 108 to rank advertisements in those circumstances in which there is a paucity of performance data. This occurs, for instance, when it is necessary to compute the expected value of a new advertisement.

A first solution computes the expected value of an advertisement based on a randomized estimate of the advertisement's conversion rate (e.g., CTR). This randomized estimate can be obtained by forming a probability distribution of CTR values for the advertisement, and then selecting the randomized estimate from this probability distribution. The probability distribution is based on actual performance data collected for the advertisement thus far.

For the particular case of a new advertisement (for which there may be insufficient performance data), the first solution can upwardly-offset the probability distribution, such as by artificially elevating one or more parameters that characterize the probability distribution (such as, by not limited to, the mean of the probability distribution). For example, assume that the AM functionality 108 determines that the mean of CTRs for a relatively new advertisement is 3.5 (i.e., µ=3.5). This distribution parameter is based on the performance data currently at hand (which, as stated, may be meager). The first solution "artificially" elevates this history-based distribution parameter so that it becomes slightly higher, such as 3.65. This may allow this new advertisement to rank more favorably vis-à-vis more mature advertisements. This, in turn, may result in the publication of the new advertisement, allowing the new advertisement to prove its economic viability (or lack of economic viability). In other words, the upward offset acts as a kind of sheltered "head-start" program, giving the new advertisement a chance to prove its worth. This prevents the more mature advertisements that have proven "track records" from "starving out" the new advertisement. This strategy is desirable because the new advertisement may prove to be more successful than the mature advertisements, and therefore may eventually unseat one or more of the mature advertisements upon subsequent rankings. Section C provides additional information regarding this solution.

A second solution relies on information in the data store 420 to help compute the expected value of a new advertisement (or to compute the expected value of any advertisement having a deficiency of directly-on-point performance data). For example, the AM functionality 108 can analyze the characteristics of a new advertisement, and then define a grouping of information in the data stores 420 which is relevant to the new advertisement. The AM functionality can then apply the grouping of information to the computation of the expected value for the new advertisement. Section D provides additional information regarding this solution.

A third solution selects a pricing strategy to be applied to an advertisement, and thereafter periodically revises the selection of this pricing strategy. For example, in one exemplary approach, the AM functionality 108 can display an advertisement in a trial period (based on a number of "free" impressions) even though the advertisement may not yet have proven its worth. The CPT model can be applied to the advertisement in the trial period. At the end of the trial period, the AM functionality 108 can evaluate what kind of pricing strategy is best suited for the advertisement (if any). For example, if the advertisement proves unsuccessful in the trial period, the AM functionality 108 can give the advertiser the option of: (a) applying the CPM model (instead of the CPT model) to the advertisement; (b) applying the CPT model to the advertisement, but paying the ad network an amount of money that compensates the ad network for its opportunity cost (which it suffers because it its is publishing an under-performing advertisement); or (c) inactivating the advertisement so that it is not published under any costing paradigm. Section E provides additional information regarding this solution.

Figure 8:
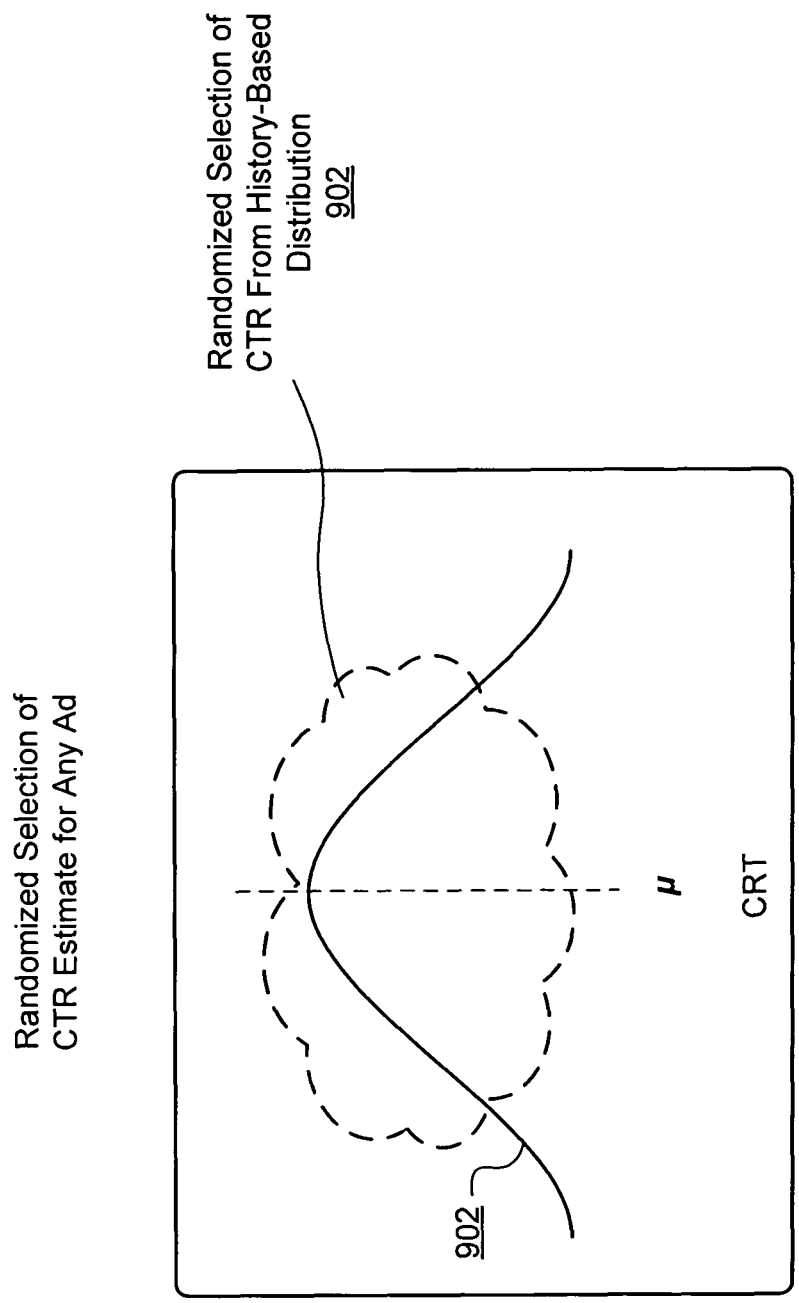
FIGS. 8 and 9 graphically illustrate the use of probability distributions to derive estimates of advertisement performance, for application to the ranking procedure shown in FIG. 7.
Figure 9:
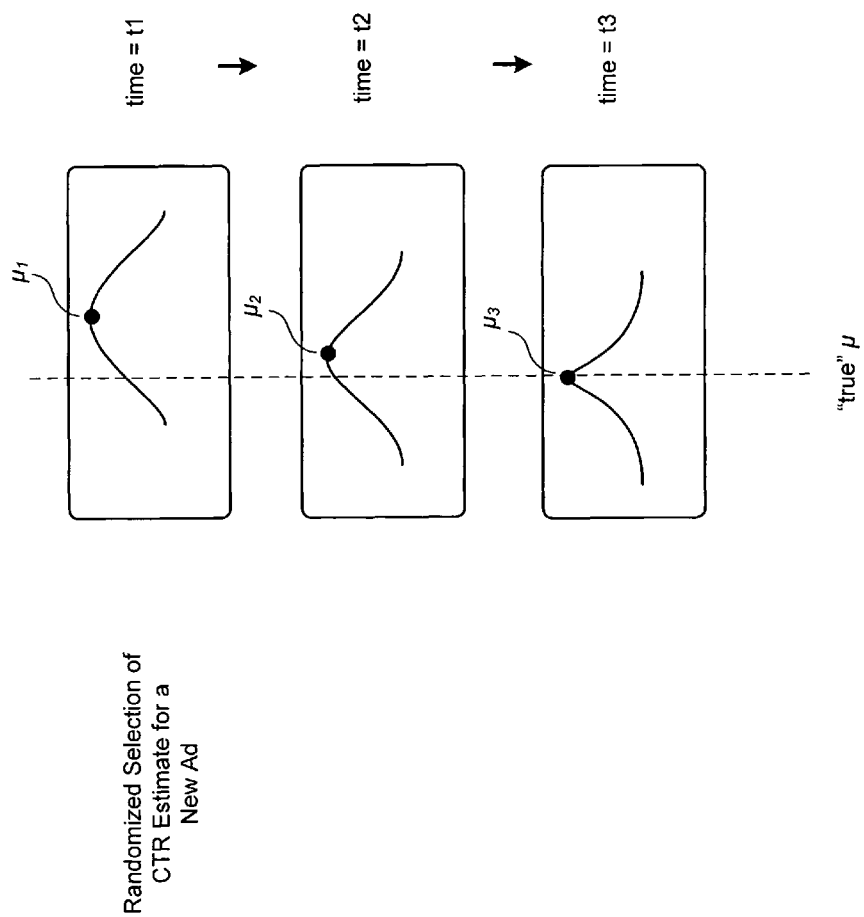

C. Exemplary Ad Ranking Strategies (FIGS. 7-9)

Figure 7:
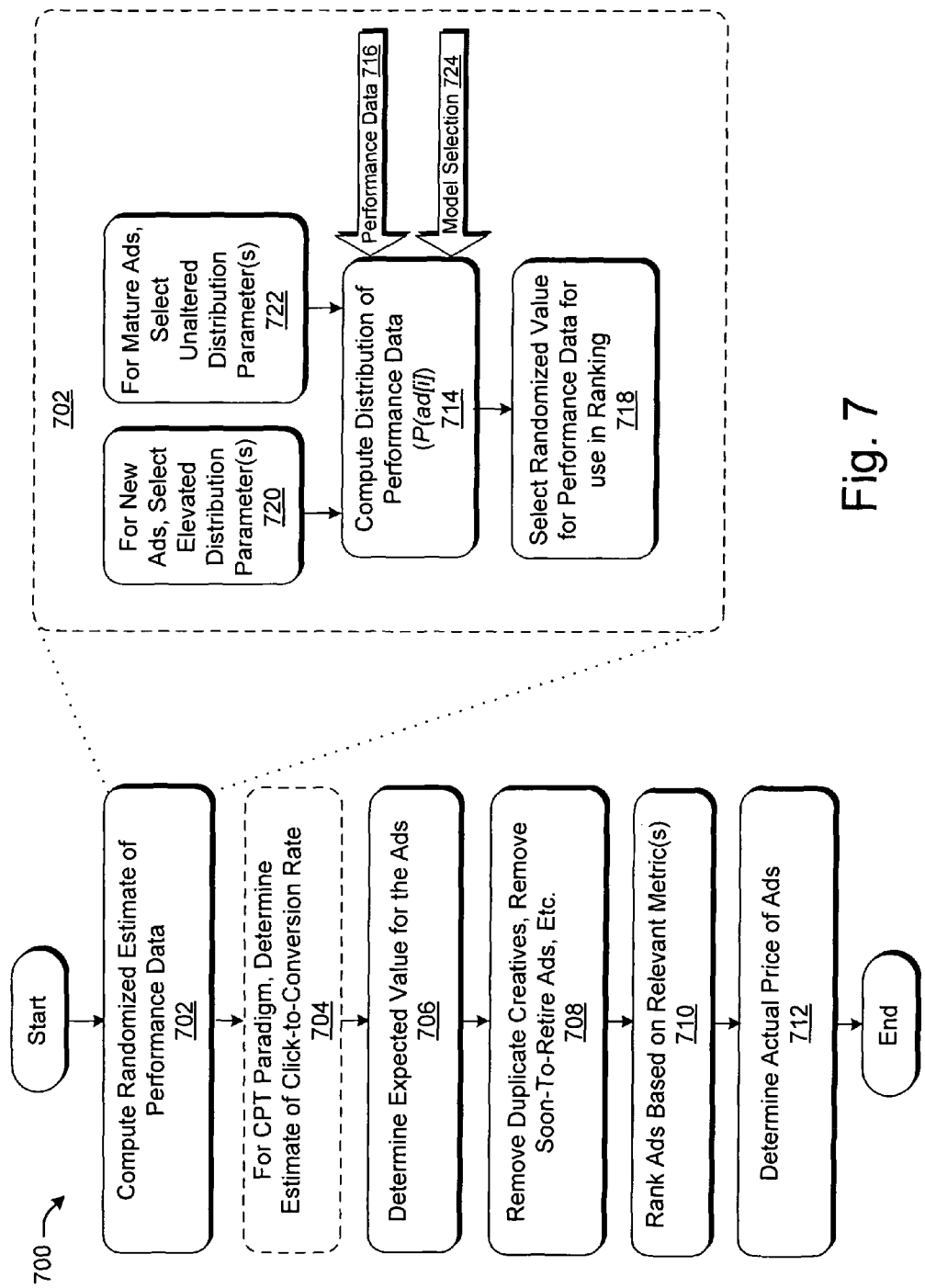
FIG. 7 shows an exemplary procedure for ranking advertisements in a pseudo-random manner using the ad management functionality of FIG. 4.

FIG. 7 shows an overview of a procedure 700 for ranking advertisements. That is, the procedure examines a set of K advertisements that satisfy a query, and, from that set, selects a set of the N potentially most profitable advertisements (where profit is assessed from the standpoint of the entity which administers the AM functionality 108, i.e., the ad network). Typically, K>N. The procedure also incorporates a mechanism which allows new advertisements to potentially receive an artificial boost in the rankings, allowing these new advertisements to prove their worth. The following discussion first presents an overview of the procedure 700, and then provides additional detail regarded selected steps in the procedure 700.

In step 702, the AM functionality 108 (e.g., the ad analysis module 410 of the AM functionality 108) computes a randomized estimate of the performance of an advertisement under consideration. Different metrics can be used to assess the performance of the advertisement. The exemplary and non-limiting metric that is featured in the examples that follow is click-through rate (CTR). The estimate is "randomized" because there is a random component to the estimate. For instance, to compute the randomized estimate, step 702 can comprise forming a probability-based representation of CTR values, and then selecting the randomized estimate from this probability-based representation. The probability-based representation reflects, in part, the performance exhibited by the advertisement thus far.

In addition, for new advertisements, the randomized estimate can be drawn from a probability-based representation of CTR that is, overall, elevated. This elevation can be achieved by upwardly offsetting one or more parameters that characterize the probability-based representation (such as, but not limited to, the mean of the distribution). The random offset allows new advertisements (as well as other advertisements that may lack sufficient performance data) to prove their worth. Without this provision, the more mature advertisements may preclude the presentation of new advertisements. Precluding new advertisements because of their uncertain performance is undesirable because these advertisements may prove to be more profitable than mature advertisements.

In one case, the amount of random offset that is applied to a new advertisement is based on the quantity of performance data that has been collected for an advertisement. This means that a new advertisement that has a relatively meager amount of performance data may receive a relatively large upward offset, while a new advertisement having a larger amount of performance data may receive a smaller upward offset. This produces desirable results, as an advertisement that has accumulated a large volume of performance data can be satisfactorily evaluated based on the performance data itself without giving it an artificial boost in the rankings. If this mature advertisement later proves to be unsuccessful, then it does not deserve to be published in any event.

In step 704, the AM functionality 108 can derive additional performance estimates. For example, assume that a CPT model is being used (in which a transaction is defined as some event other than a mere click, such as a form-filling event, a sale, etc.). In this case, step 704 can derive an estimate of the probability that a user who has clicked on the advertisement will follow up by also performing a cost-accruing transaction (such as by purchasing the advertised product). This metric can be referred to as the click-to-conversion rate.

In step 706, the AM functionality 108 computes the expected value based on the above-described performance estimates. For example, the AM functionality 108 can compute the expected value as function of the bidding information, the randomized CTR value, and the click-to-conversion rate information (if applicable). The bidding information, for example, may comprise a maximum amount of money that an advertiser has agreed to pay when a user clicks on the advertisement (referred to as Max_CPC). At this point in the procedure 700, the AM Functionality 108 has produced expected values for a set of K advertisements that satisfy the user's query.

In step 708, the AM functionality 108 can perform various post-processing operations on the expected values computed in the preceding step (706). According to one feature of step 708, the AM functionality 108 can identify advertisements that have similar creatives. The creative of an advertisement defines the text of the advertisement that is displayed to the user. Again, these conflicts in creatives can be resolved by relying on preference scores assigned to different advertisers, e.g., by eliminating the advertisement with the lowest preference score. Or these conflicts can be resolved by selecting one of the conflicting advertisements in a random fashion. Again, these selection mechanisms can consider state, such that no one advertisement is consistently favored over other similar advertisements.

As another feature of step 708, the AM functionality 108 can also remove advertisements that are nearing the end of their advertising campaign. That is, an advertiser may agree to pay for the publication of its advertisement only for a defined period of time, or only until a defined amount of money is exhausted. Step 708 can identify advertisements that are nearing the end of their viable lifetimes, and remove these advertisements from further analysis.

In step 710, the AM functionality 108 ranks the remaining set of advertisements from highest-to-lowest expectation values, and selects the top (most profitable) set of N advertisements. In the procedure 700, step 708 is shown as preceding step 710, but it is also possible to perform the ranking first followed by the removal of the redundant or conflicting advertisements (in the manner described above for step 708). If this alternative strategy is used, then the removal of an advertisement from the set of N advertisements will require the addition of another advertisement from the pool of non-selected advertisements.

In step 712, the AM functionality 108 determines the costs which will actually be charged to the advertisers upon the occurrence of cost-accruing events associated with the advertisements. For example, if the advertisements are priced on a CPC basis, then step 712 determines the costs that will be charged to the advertisers upon the users clicking on the advertisements. If the advertisements are priced on a cost-per-sales basis, then step 712 determines the costs that will be charged to the advertisers upon the users actually purchasing the advertised assets. Various known algorithms can be used to compute the price of an advertisement. In general, one approach is to compute the actual price charged to the advertisers in such a manner that advertisements retain their rank (vis-à-vis other advertisements in the ranking), and such that the costs are above a minimum minBid floor and below the Max_CPC amounts bid by the advertisers. In general, for the CPT pricing model, it is possible to determine the cost of an advertisement in advance of the transaction event if the basis for assessing the cost is not contingent on unique information associated with the transaction. For example, assume that an advertiser agrees to pay a fixed amount of money upon the sale of an advertised asset. In this case, the AM functionality 108 can calculate the cost of the advertisement at the time of an impression, e.g., after a user has clicked on the advertisement. However, whether or not the advertiser is charged for a transaction is contingent on whether or not a user consummates a transaction after clicking on the advertisement.

On the other hand, assume that the advertiser agrees to pay the entity that administer the AM functionality 108 (e.g., the ad network) a share of the revenue it earns in a sale transaction. Prior to the sales event, the AM functionality 108 may not have advance knowledge of the amount of revenue that an advertiser will earn upon a sale, and therefore the AM functionality 108 may not be in a position to calculate the advertising cost of the sales event prior to its occurrence. And even when the transaction event does occur, the AM functionality 108 needs to incorporate tracking provisions to determine the actual sales amount, or rely on the advertiser to independently forward this information to the AM functionality 108. In the case, however, where entity Z of FIG. 1 implements all of the functionalities (108, 110, 112), the AM functionality 108 is presumed to have sales data immediately at its disposal.

The procedure 700 shown in FIG. 7 terminates with the publication of the N top ranked advertisements by the publication functionality 110. More specifically, consider the case in which the publication functionality 110 publishes the advertisements in different presentation "slots," the different slots having different respective values associated therewith. A number of characteristics of a slot may contribute to its value, including its placement on the screen, its size; its style, the amount of information it imparts, and so forth. The publication functionality 110 can allocate the N selected advertisements to different slots depending on the respective expected values of the advertisements, such that the highest ranked advertisement will be displayed in the most valuable slot, the second most valuable advertisement will be displayed in the next most valuable slot, and so forth.

Further details will now be provided on selected steps in the procedure 700.

Consider step 702, which involves forming the randomized estimate of performance data. One method of performing this step is outlined by the series of substeps enclosed in dashed lines to the right of step 702.

In substep 714, the AM functionality 108 can form a distribution of performance data for the advertisement under consideration. In other words, as indicated by step 716, the AM functionality 108 can collect any available data which reflects how well the advertisement under consideration has performed (if, in fact, this advertisement has been previously published). In one exemplary case, the performance data corresponds to conversion rate information (such as CTR values) exhibited by the advertisement. Step 714 then involves computing a probability distribution that is based on the collected performance data. The probability distribution can be formed based on (or is otherwise characterized by) one or more parameters, such as, but not limited to, mean $\mu$, standard deviation $\sigma$, and so forth. In one exemplary and non-limiting implementation, the AM functionality 108 can form a normal distribution of performance data, $N(\mu,\sigma)$. Other types of probability distributions can also be used.

In step 718, the AM functionality 108 selects a value from the probability distribution formed in step 716 to provide the CTR estimate. The CTR estimate has both a randomized component and a historical component. The historical component ensues from the fact that the probability distribution is ultimately based on the actual performance data collected in step 716. The random component ensues from the fact that the estimate is nevertheless selected from a "cloud" of possible values, rather than deterministically selected using, for example, a deterministic formula. Advancing to FIG. 8, this figure shows an exemplary distribution 802 of CTR values formed from performance data. This particular distribution 802 is characterized by a mean value $\mu$. The mean value defines the most likely value for CTR. However, the AM functionality 108 generally draws from a cloud of possible values 804 defined by the probability distribution 802. Selection of a value from this cloud 804 inherently provides a CTR estimate having a random component to it. Any given selection of CTR may correspond to a value which is below the mean, above the mean, or approximately equal to the mean.

Use of randomized estimates for CTR (or any other performance metric) is advantageous for a number of reasons. For instance, in some circumstances, two advertisements may have very similar computed expected values, producing a "virtual tie" situation. In this scenario, it may be somewhat ambiguous as to which one of the advertisements should prevail, particularly considering the inherent uncertainties involved in the computation of expected value. This becomes an issue because the winning advertisement may enjoy a more favorable presentation "slot" when published by the publication functionality 110. Moreover, with a deterministic computation of expected value, one of the advertisements may be consistently favored over the other, and therefore continue to receive preferential treatment by the publication functionality 110. This, in turn, may prevent the disfavored advertisement from proving its worth vis-à-vis its closely-related competitor.

The use of randomized estimates remedies this problem by slightly varying the expected values. This means that neither of the competitors in a virtual tie situation will consistently prevail over the other. This consequently allows both of the competitors to prove their relative merit. Further, in the cusp situation (where there is a virtual tie between the $N^{th}$ advertisement and the $N+1^{th}$ advertisement), judicious resolution of the tie is critical because only one of these advertisements will be displayed as a result of the tie-breaking decision. By virtue of the use of randomization, neither the $N^{th}$ advertisement nor the $N+1^{th}$ advertisement will be consistently favored over the long run.

By virtue of the above features, the ad network governs the presentation of advertisements using a type of control loop, where the computation of expected values determines the advertisements that will be displayed, and the performance of the advertisements alters a subsequent computation of expected values. The use of randomization maintains a robust control loop, constantly challenging its assumptions, preventing the system from entering into undesirable states of stasis in which "inferior" advertisements "starve out" potentially more profitable advertisements. In political terms, the ad network is thus configured as a stable meritocracy.

Returning to FIG. 7, the above-described randomized processing is appropriate for any advertisement, including "mature" advertisements that have an established "track record" based on a significant amount of performance data, as well as relatively new advertisements that have not generated as much performance data. More formally, a new advertisement can be distinguished from a mature advertisement based on various metrics, such as the number of performance measurements that have been made, and so forth. More advanced tools (such as Bayesian analysis) can be used to determine whether the population of performance data is sufficient to generate CTR estimates with a desired degree of certainty, in which case the advertisement can be considered mature.

As indicated in FIG. 7, special circumstances can be applied to new advertisements. Namely, in step 720, the probability distribution for new advertisements can be essentially upwardly shifted. This ultimately results in the generation of CTR estimates that are artificially inflated. This, in turn, allows the new advertisements to more favorably compete with mature advertisements. In contrast, as indicated in step 722, mature advertisements do not receive this kind of upward offset. For the case of mature advertisements, the AM functionality 108 uses an unaltered history-based probability distribution.

One way of upwardly shifting a probability distribution is to elevate one or more parameters that are used to form (or otherwise characterize) the probability distribution. In one case, for example, this may involve artificially inflating the mean $\mu$ of the distribution. In another case, this may involve artificially inflating one or more other parameters, which may indirectly be manifested in an elevated mean. Various other implementations are possible. In addition, the AM functionality 108 can produce a probability distribution for a new advertisement that has a relatively wide standard deviation (compared to the "true" standard deviation which will be manifested when the advertisement becomes mature).

The extent to which the probability distribution is artificially altered is a function of the amount of performance data that has been collected for the advertisement. This means that brand new advertisements will have the greatest relative offset, and that this offset will progressively decrease as the advertisement begins to generate performance data. Consider, for example, FIG. 9. This figure shows a characteristic sequence of probability distributions for a new advertisement under consideration, computed at different times in the lifecycle of the advertisement (at times=t1, t2, t3, etc.). For example, at time=t1, assume that the publication functionality 110 has just started to publish the advertisement. As such, there is a scarcity of CTR performance data from which to assess the performance of the advertisement. This situation results in the computation of a distribution having a relatively large offset in its mean ($\mu$) and a relatively wide dispersal ($\sigma$) of estimated CTR data. Time=t2 reflects a later point of time, at which point more performance data has been collected. Time=t3 reflects a still later time, at which point even more performance data has been collected. Note that, due to the reliance on a progressively more robust collection of actual performance data, the distribution progressively converges to the actual ("true") values of $\mu$, $\sigma$ over time. This example's use of the mean $\mu$ as the distribution parameter which receives a boost is merely illustrative; other implementations can choose to elevate other parameters. Returning a final time to FIG. 7, step 724 indicates that the AM functionality 108 can use different models to compute an estimate of CTR. For example, the AM functionality 108 can apply these different models in parallel. At any one time, one of the models can be used to drive the system, and the other models can be operating in the background in "shadow mode" (without directly driving the system). The AM functionality 108 can periodically compare the performance of the different models and select the model that appears to be doing the best job at modeling the performance of the advertisement. This determination can be based on any combination of metrics. Generally, a model that drives the system into relatively dramatic control loop deviations is not a suitable model. A model that prevents new advertisements from appropriately demonstrating their worth vis-à-vis more mature advertisements is not a suitable model. A model that allows new advertisements with unproven performance to "cannibalize" more mature advertisements is not a suitable model, and so forth.

A number of supplemental factors may impact the computation of the randomized estimate of performance data. Therefore, depending on the application environment, the AM functionality 108 may choose to apply various correction factors to the randomized estimate of performance data computed in step 702. For example, different correction factors may be appropriate to account for the match type that the ad is using (e.g., broad, phrase, exact, etc.). Further, different corrections factors may be appropriate to account for the number of key terms that the advertiser selects for the advertisement (e.g., for the "broad" category of match type). In general, it may be most appropriate to apply these kinds of adjustment factors for new advertisements that have not generated much performance data. For more mature advertisements, the performance data itself should provide a relatively sound basis for computing the expected value of the advertisement under consideration, that is, without a consideration of special factors that may impact the expected value. That is, in effect, the more robust data set for the mature advertisements already reflects any special considerations that may apply to the advertisements.

Now providing more details regarding step 706, the expected value of an advertisement under consideration can be computed as:

$$\text{Expected\_Value} = \text{CTR}_{random} * \text{Max\_CPC}$$

where Expected_Value is the expected value of the advertisement, $\text{CTR}_{random}$ is the randomized estimate of the performance data (e.g., as gleaned from the normal distribution in the manner described above), and Max_CPC is the maximum amount of money that the advertiser has agreed to pay for a click-through event. This score can be interpreted as an expectation of the maximum revenue that the ad network will receive by choosing this advertisement for publication.

In the event that a CPT model is used to determine expected value (where the triggering transaction is some event other than a click-through event), then the value of Expected_Value can be derived by also multiplying the above-described variables by a Click_to_Conversion parameter. This Click_to_Conversion parameter describes an estimate of the probability that a user who clicks on an advertisement will follow through and make a cost-accruing transaction (such as the purchase of an asset).

D. Exemplary Ad Aggregation Strategies (FIGS. 10 and 11)

Figure 10:
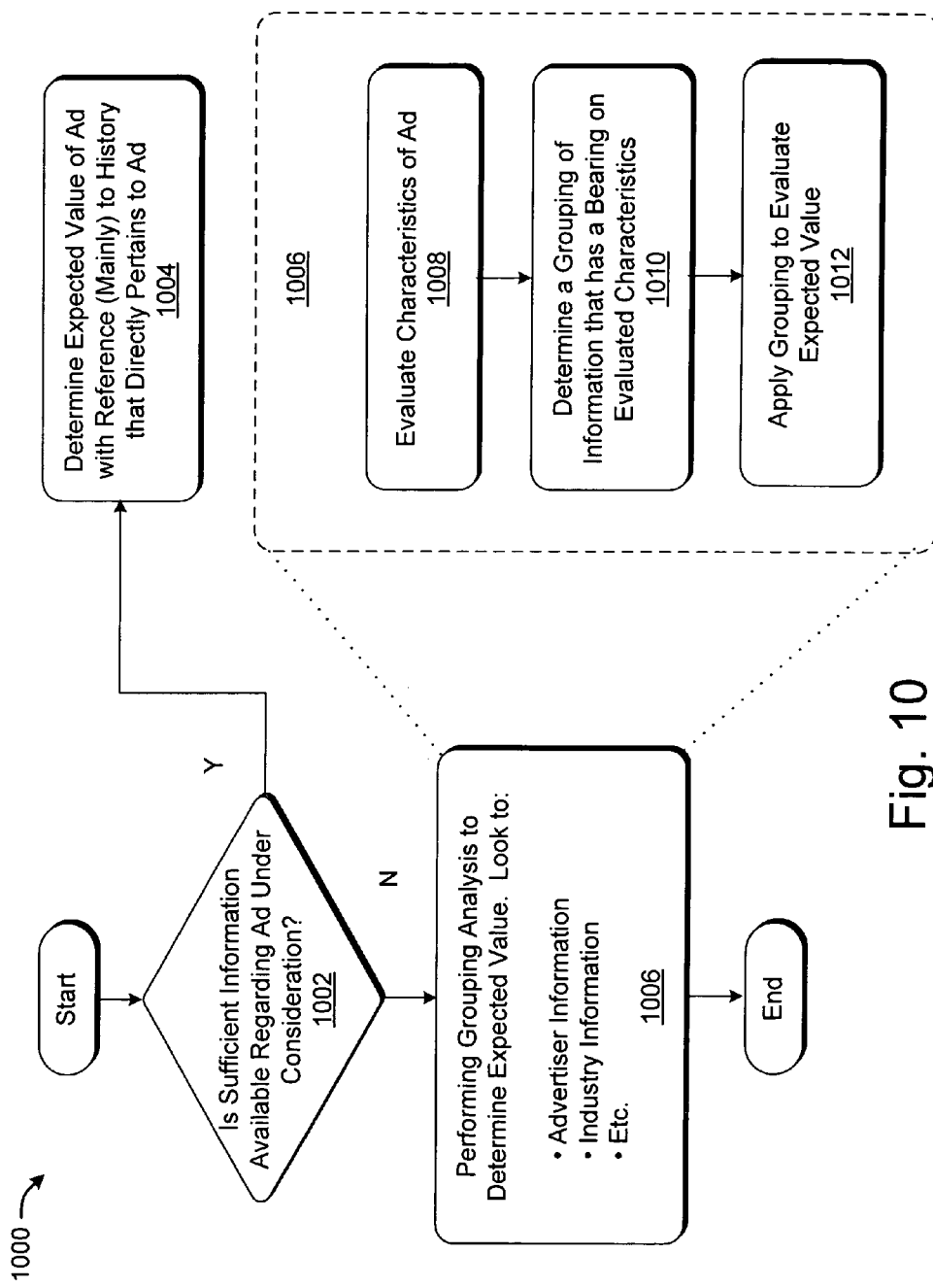
FIG. 10 shows an exemplary procedure for using grouping analysis in assessing the expected performance of an advertisement.
Figure 11:
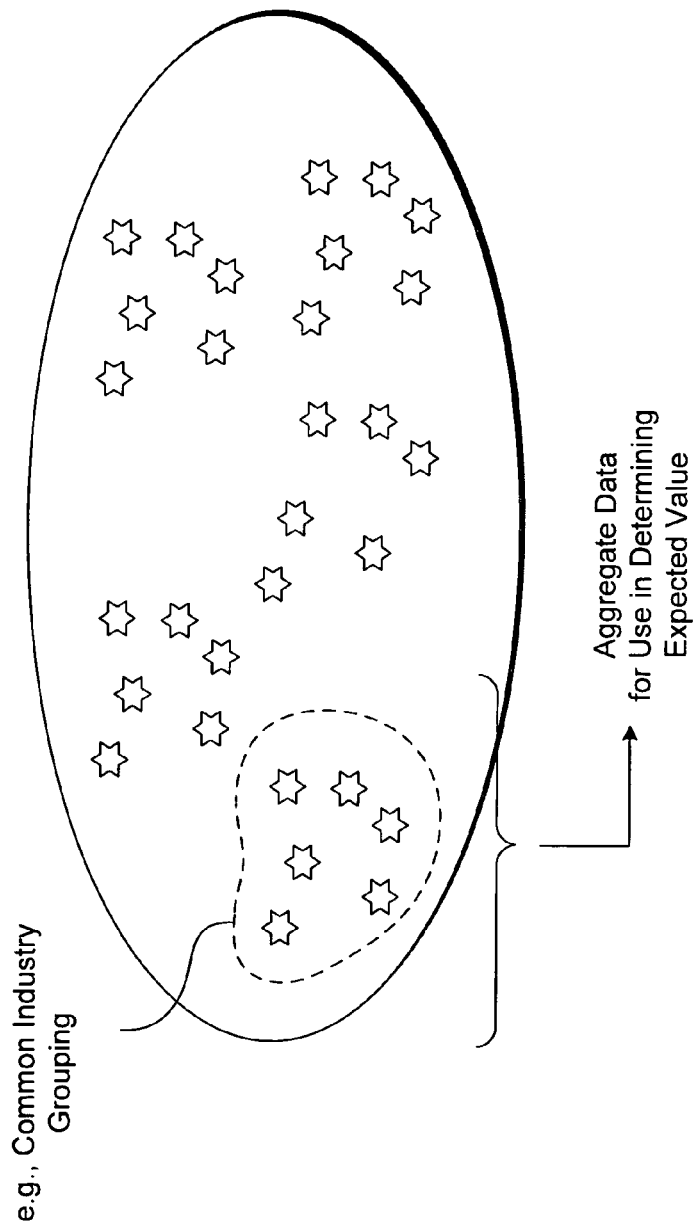
FIG. 11 graphically illustrates the operation of the grouping analysis shown in FIG. 10.

FIG. 10 shows an overview of a procedure 1000 for determining the expected value of an advertisement using grouping analysis. That is, the procedure 1000 attempts to find commonality between an advertisement under consideration and a group of other advertisements (or other salient information). The procedure 1000 then uses information extracted from the group to facilitate the computation of the expected value of the advertisement under consideration.

In step 1002, the AM functionality 108 determines whether there is sufficient performance data for the advertisement under consideration to make an estimate of the advertisement's expected value. For instance, this step may involve comparing the amount of information stored in the ad performance store 426 (of FIG. 4) with a threshold to determine whether the expected value can be computed with a sufficient degree of confidence based on the advertisement's own performance data. To be more explicit, the performance data being referred to here reflects the performance of the advertisement under consideration itself, e.g., as gleaned from prior publications of the advertisement.

In step 1004, if step 1002 is answered in the affirmative, then the AM functionality 108 determines the expected value of the advertisement based on the advertisement's own performance data.

In step 1006, if step 1002 is answered in the negative, then the AM functionality can determine the expected value of the advertisement based, in part, on grouping analysis applied to data stored in the data stores 420 (of FIG. 4). The objective here is to determine information stored in the data stores 420 that is relevant to the advertisement under consideration, and then apply this relevant information to the determination of the expected vale of the advertisement under consideration.

Steps 1004 and 1006 are illustrated in FIG. 10 as binary choices—either the AM functionality 108 computes the expected value based on the advertisement's own performance data, or the AM functionality 108 computes the expected value based on related information extracted using grouping analysis. However, an implementation can combine these two methods together, such that the expected value is computed based on a combination of the advertisement's own performance data and related information extracted through grouping analysis. In this implementation, the grouping analysis can supplement and enhance the more deterministic computations made based on the advertisement's own performance data.

FIG. 10 expands step 1006 by showing exemplary substeps that can be used to perform this step.

In a first substep 1008, the AM functionality 108 evaluates the characteristics of the advertisement under consideration. This substep may involve determining the salient characteristics of the advertisement, such as the keywords that it uses, the match type that it specifies, the industry that it targets, the advertiser that sponsors the advertisement, the channel that is being used to disseminate the advertisement, and so on. These properties may be defined as attributes associated with the advertisement, or may be defined by or inferred from other sources.

In substep 1010, the AM functionality 108 examines the data stores 420 to determine a group of information that has properties that are similar to assessed characteristics of the advertisement under consideration. This operation may involve examining the data fields of the data stores 420 to determine if there is a match between the characteristics of the advertisement under consideration and any other prior advertisements. The result of substep 1010 is the potential production of a group of M advertisements and other potential information which are considered relevant to the advertisement under consideration. The AM functionality 108 can be configured to apply varying degrees of exactness in defining the conditions which constitute a match between the advertisement under consideration and the information stored in the data stores 420.

In substep 1012, the AM functionality 108 applies the information gleaned from substep 1012 to the computation of the expected value of the advertisement under consideration. Different techniques can be used to perform this substep. In one case, the expected value of the advertisement under consideration can be computed in the manner described in the previous section, and the grouping analysis applied in procedure 1000 can then be used to derive correction factors which can be applied to adjust this expected value.

To take one illustrative case, assume that the algorithm described in the preceding section computes an expected value of 5.0 for a relatively new advertisement for a ROLEX watch. Assume next that the grouping analysis of procedure 1000 identifies a group of related advertisements pertaining to other high-end watches, where such advertisements are mature and have relatively stable expected values of 4.3, 4.2, 4.2, 3.9, and 4.0, respectively (where such expected values have been derived from robust performance samples for these advertisements). In this scenario, the AM functionality 108 can compute the expected value for the ROLEX advertisement by determining the average of 5.0, 4.3, 4.2, 4.2, 3.9, and 4.0, which is 4.27. This operation thus has the effect of lowering the expected value of the advertisement computed according to the method of the preceding section.

In other cases, the AM functionality 108 can potentially calculate the expected value of the advertisement under consideration based solely on grouping analysis (e.g., in those cases in which there is absolutely no performance data for the advertisement under consideration).

In addition to parameter-matching techniques (in step 1010), more complex techniques and tools can be used to determine a group of items that is related to the characteristics of a new advertisement under consideration. For example, according to one technique, the AM functionality 108 can determine the group of items based on an analysis of the classification of items within a browse tree. For example, the items can be organized as nodes within a hierarchical browse tree (or graph). The traversal distance between one node and another node in the tree is representative of the relatedness between these items. Thus, the AM functionality 108 can identify a group of similar items by identifying the location the new advertisement in the browse tree, and then selecting a group of other items within a certain "distance" from this location.

Another way to determine related items is through analysis of the purchases or other selections made by a population of users. For example, if many people who purchased item X also purchased item Y, this might empirically indicate that these items are similar in some respect. In operation, this technique can generate a similarity table which reflects the empirically derived similarity of items, and then use this table to select a group of items which is deemed related to a new advertisement. U.S. Pat. Nos. 6,266,649 and 6,853,982 provide further exemplary details regarding an empirical-based algorithm (used to generate product recommendations) that can be applied in the present context of an ad network to identify related advertisements.

Other possible tools that can be used to extract meaningful relationship include cluster analysis, pattern analysis, neural network analysis, artificial intelligence analysis, and so forth.

In more general terms, there are many bases for grouping information in the data stores 420 for potential application to advertisements under consideration. Exemplary bases for grouping information include:

A grouping can be defined that collects advertisement information for each advertiser that routinely does business with the system 100.

A grouping can be defined for various industries, product categories, market segments, and so forth.

A grouping can be defined for various channels used to disseminate advertisements.

A grouping can be defined for various seasonal considerations. For example, the AM functionality 108 can determine whether there are certain trends associated with the time of year that advertisements are published.

A grouping can be defined associated with geographical considerations. For example, the AM functionality 108 can determine whether there are certain trends associated with the geographical regions in which advertisements are published.

A grouping can be defined for different characteristics of advertisements themselves. For example, the AM functionality 108 may find that advertisements that have certain properties (such as certain creatives-related properties, match type properties, and so forth) have characteristic behavior in the marketplace that can be applied to the evaluation of new advertisements under consideration.

A grouping can be defined for language-related considerations. For example, the AM functionality 108 may find that creatives expressed in different languages invoke different patterns of behavior in the online marketplace.

A grouping can be defined based on the popularity of an online site (or sites) associated with or related to the advertisement. For example, assume that the ad network receives a request to publish an advertisement for a ROLEX watch, but there is a scarcity of information regarding this particular advertisement (e.g., because the advertisement is new). In response, the ad network can attempt to extract information that reflects the popularity of any site or sites sponsored by the manufacturer of the ROLEX watch. For example, in one case, the advertisement can link to a ROLEX web page that is also directly accessible to the public, independent of the advertisement (e.g., without necessarily requiring the user to click on the advertisement). If this site is known to be relatively popular in general, then this inferentially suggests that the advertisement for the ROLEX watch (which directly links to this page) may also be popular, and thus produce a satisfactory CTR. Such popularity data can be collected through various mechanisms. In general, the popularity of the site can be extracted by monitoring the number of "hits" that a website receives, e.g., as reflected by the number of times a certain URL has been activated. This information can be directly measured by the ad network (if possible). Or this information can be provided by the advertiser itself, or some third party agent which monitors online traffic.

Other kinds of popularity or marketing data may be inferentially related to the expected value of a new advertisement under consideration, and can be profitably mined to compute the expected value. Exemplary types of resources that can be mined include the popularity of other web pages administered by the advertiser (even though not directly linked to the new advertisement), sales data for the product being advertised, survey results, marketing analysis, and so forth.

Still other bases for grouping information in the data stores 420 are envisioned. The above list of groupings is merely representative.

FIG. 11 graphically illustrates the manner in which the AM functionality 108 can cull a group of information in the data stores 420 for application to an advertisement under consideration. In this illustrative case, assume that the advertisement under consideration pertains to a ROLEX watch. In this case, the grouping of information shown in FIG. 11 may correspond to advertisements associated with the same industry or market segment. For instance, the grouping may correspond broadly to time-keeping devices. Or the grouping may correspond more narrowly to watches. Or the grouping may correspond still more narrowly to high-end watches, and so on.

Finally, according to a related feature, the advertisement ranking computations can be specifically tailored to the characteristics of a user who interacts with the system. Exemplary characteristics of the user can include the user's: age; gender; geographic location (e.g., where the user lives); level of education; language; cultural background; interests; marital status; purchase history; other online behavior, and so forth. Such information can be extracted from various sources. For instance, the user may optionally expressly provide such information, e.g., by responding to an online questionnaire. Alternatively, or in addition, the ad network or some other entity may infer the characteristics of the user. For example, a user who views many web sites that cater to senior citizens is likely to be an elderly person.

The ad network can use its knowledge of the characteristics of the user to adjust the expected values of the candidate advertisements. Such adjustments can take any form depending on different considerations that might apply to different environments. In one illustrative case, the ad network can add a prescribed amount to the expected value of an advertisement when it is known that this advertisement is specifically appropriate for the user who will receive the advertisement. Again consider the case of an elderly user. Assume that this user inputs a key term "car." The ad network can generate a list of K advertisements relating to automobiles, but slightly upwardly offset the advertisements for automobiles that might appeal to an older age group. Further assume that it is known that this particular user's last three vehicles were CADILLAC brand vehicles. This information can be further used to upwardly offset certain advertisements. The ad network might also negatively offset certain advertisements which are known to be inappropriate in view of the characteristics of the user. These offsets will influence the ranking of advertisements, and consequently may affect which advertisements are ultimately presented to the user.

As a further expansion of this strategy, the ad network can collect performance data on a segment by segment basis. The ad network can use this performance data to fine tune its decision-making as to what kinds of advertisements are most effective for different segments of users.

In one approach, an advertiser can bid a single amount for its advertisement, and the ad network can automatically expose the advertisement to different segments as it deems appropriate. In another approach, the advertiser can bid different amounts to target different segments. Still other variations of this design concept are possible.

Figure 13:
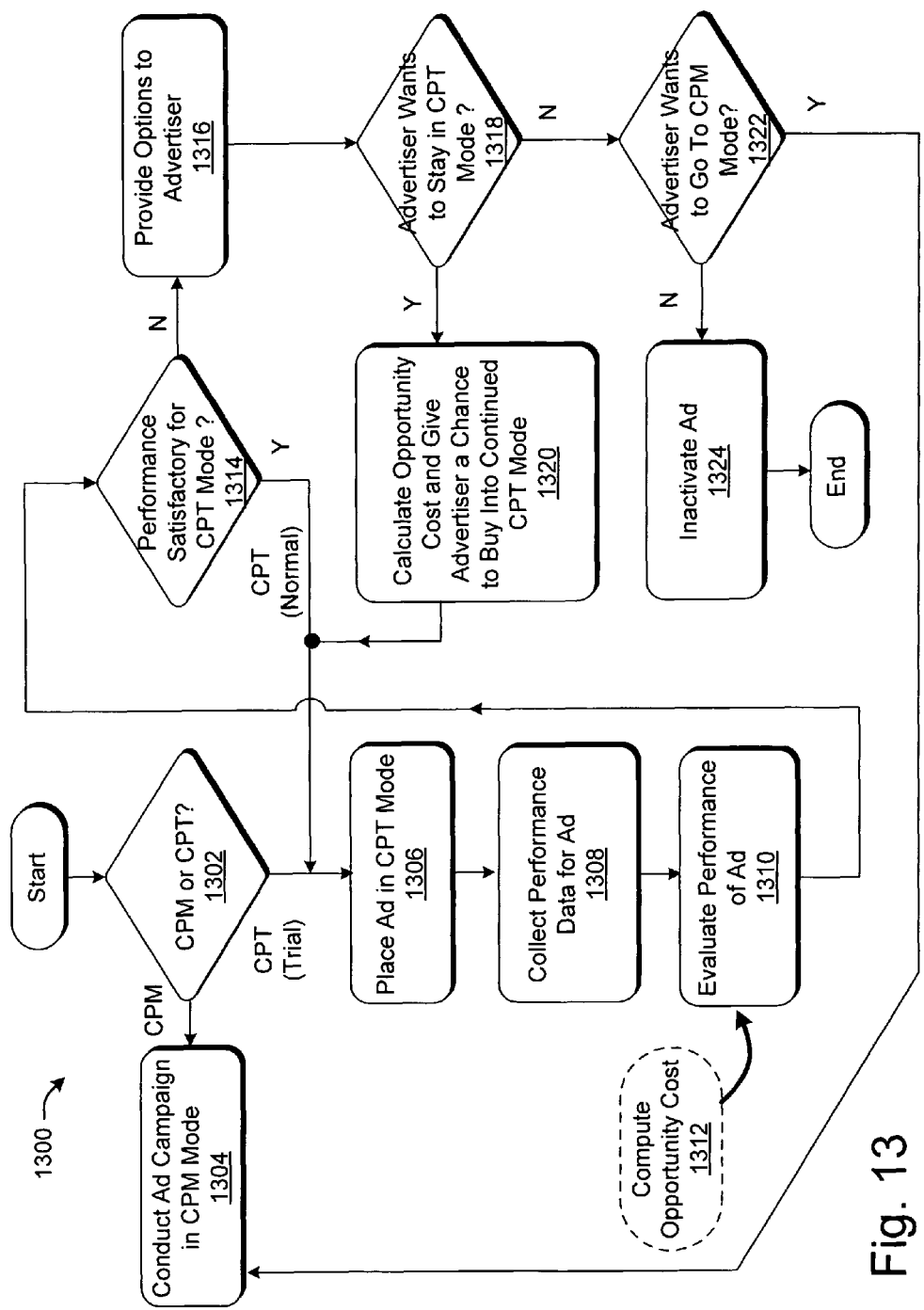
FIG. 13 shows a more detailed exemplary implementation of the price-selection strategy shown in FIG. 12.
Figure 14:
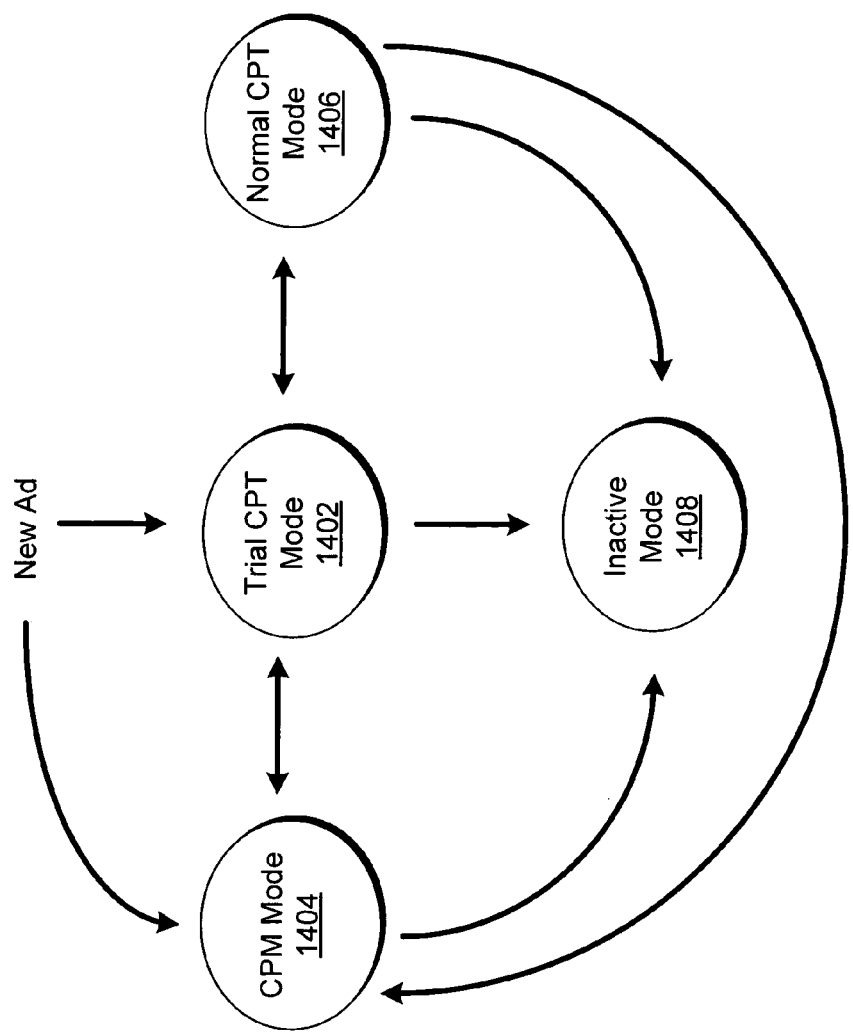
FIG. 14 graphically illustrates the transition among different pricing modes enabled by the price-selection strategy shown in FIG. 13.

E. Exemplary Pricing Model Selection Strategies (FIGS. 12-14)

Figure 12:
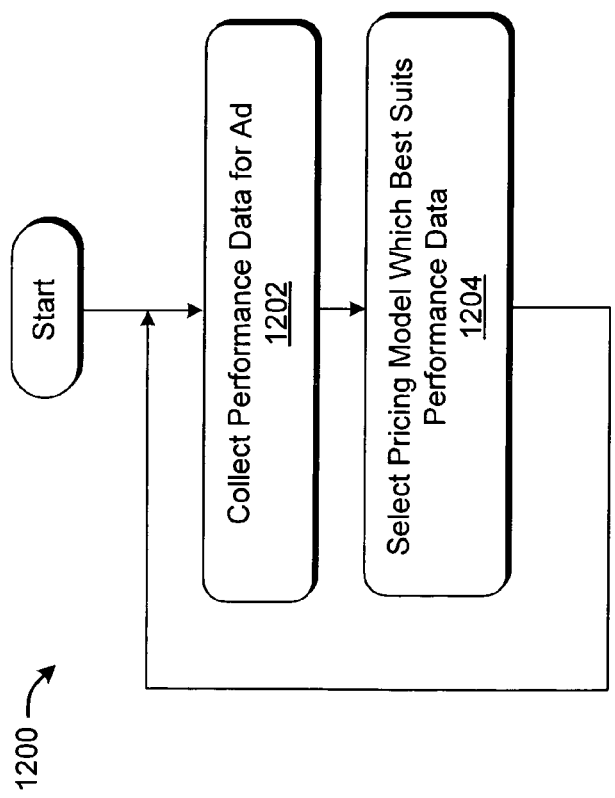
FIG. 12 shows an overview of an exemplary procedure for selecting a pricing model which is best suited for an advertisement under consideration.

FIG. 12 shows an overview of a procedure 1200 by which the AM functionality 108 can determine an optimal model to be used to price an advertisement under consideration based on the advertisement's performance data, and potentially based on other factors. FIG. 13 provides a more specific implementation 1300 of the procedure 1200 shown in FIG. 12.

Beginning with the procedure 1200 of FIG. 12, in step 1202, the AM functionality 108 collects performance data which reflects how well the advertisement under consideration is doing. Such performance data can comprise any combination of impression data, click-through data, sales data, and so forth.

In step 1204, the AM functionality 108 applies the collected performance data (in combination with other potential factors) to select a pricing module that is best suited for the advertisement. As was discussed in previous sections, the pricing model determines the manner in which an advertiser is charged in an advertising campaign. Consequently, the pricing model also determines the manner in which the AM functionality 108 computes the expected value of the advertisement.

Possible pricing models include the CPM pricing model in which the advertiser is charged when the advertisement is merely presented by the user's browser. The CPT model, on the other hand, charges the advertiser only when the user takes some express action with respect to an advertisement that is presented to him or her. The action can comprise merely clicking on the advertisement to activate a page view associated with the advertisement (in which case, the CPT model reduces to the CPC model). Or the action can comprise any of the kinds of transactions discussed above, such as a sales event, a form-filling event, a registration event, and so forth.

The selection of the pricing model can be fully automated, in which case the advertiser is given no control over the selection of the pricing model. Or the selection of the pricing model can be performed in fully manual manner, in which case the advertiser is given full control over the selection of the model. Or the selection of the pricing model can be partially automated and partially performed in a manual fashion. For instance, the AM functionality 108 can automatically compute a number of viable options for the advertiser to consider, whereupon the advertiser ultimately makes a manual decision regarding the pricing model option that will be used.

The procedure 1200 shown in FIG. 12 defines a loop. This means that the AM functionality 108 periodically revises its decision as to what pricing model is most appropriate for the advertisement under consideration. That is, by virtue of the loop, new performance data is continually being collected, and this new performance data is continually being analyzed to determine whether it warrants a change in the pricing model that is applied.

FIG. 13 shows a procedure 1300 which comprises one specific exemplary implementation of the general procedure 1200 shown in FIG. 12. This procedure 1300 specifically involves switching between the CPM pricing model and the CPT model (as broadly defined).

In step 1302, the advertiser determines whether they wish to publish an advertisement in the CPM mode or the CPT mode. More specifically, the advertiser can supply this information in unsolicited fashion when they define their advertisement. Or the AM functionality 108 can specifically prompt the advertiser to select a pricing model.

In one case, only certain advertisements that have a potential for a high impression rate will be allowed to adopt the CPT model. For advertisements that have been published in the past, this determination is made by examining the advertisement's performance data. For completely new advertisements, this determination can be made using the kind of grouping analysis discussed in the preceding section. For instance, the AM functionality 108 may look to other advertisements sponsored by this advertiser, the industry pertaining to the advertisement under consideration, and so forth. In another case, the AM functionality 108 applies no restrictions regarding the kinds of new advertisements that can at be at least initially placed in the CPT mode.

If the advertiser opts for CPM mode, then the AM functionality 108 advances to step 1304, in which the CPM pricing model is applied to the advertising campaign.

On the other hand, if the advertiser opts for the CPT mode, and is permitted to enter the CPT mode, then the AM functionality 108 advances to step 1306, in which case the CPT pricing model is applied to the advertising campaign. More specifically, the AM functionality 108 initially places the advertisement in a "trial" CPT mode, as opposed to a "normal" CPT mode. The purpose of the trial CPT mode is to determine whether the advertisement will prove to be sufficiently successful to warrant continued operation in the CPT mode. The CPT-viability of the advertisement matters to the ad network because its profit is linked to the number of transactions that the advertisement invokes (such as clicks, sales, registrations, etc.). If the advertisement proves unsuccessful, then the ad network will have suffered an opportunity cost, as it potentially could have published another advertisement having better performance.

Accordingly, in step 1308, as the trial mode progresses, the AM functionality 108 collects performance data for the advertisement under consideration (also referred to as the "trial advertisement"). Again, the performance data can comprise any kind or combination of salient information, such as impression data, click-through data, sales data, etc.

In step 1310, the AM functionality evaluates the performance of the trial advertisement based on the performance data collected in step 1308. In one implementation, this evaluation occurs when the trial advertisement has exhausted a predetermined number of "free impressions" given to the advertiser for use in the trial period. In this implementation, the AM functionality 108 may impose no time limit regarding when the impressions should be "used." In another implementation, the evaluation performed in step 1308 occurs after a predetermined time has elapsed (there being no limit on the number of impressions afforded to the advertiser). In still another hybrid implementation, the evaluation occurs after the advertiser has exhausted a number of free impressions, as above, but these impressions must be used up within a given amount of time.

In any event, once invoked, the evaluation in step 1310 can comprise determining the number of impressions that the trial advertisement has invoked. For comparison purposes, in step 1312, the AM functionality 108 can also compute the projected performance of an alternative advertisement that the AM functionality 108 might have published instead of the trial advertisement. This defines the opportunity cost of publishing the trial advertisement. For example, assume that there is a collection of advertisements which were initially assessed as having very similar expected values, but the AM functionality 108 only decided to publish the trial advertisement. The opportunity cost involved in this decision can be determined by estimating the projected performance (e.g., the impression rate) of any member of this group (other than the trial advertisement itself). Or perhaps one or more such other members of this group were actually published along with the trial advertisement. In this scenario, the opportunity cost can be gauged by determining the actual performance of those other alternative advertisements.

In step 1314, the AM functionality 108 can determine whether the performance of the trial advertisement is satisfactory. Again, this can be determined by weighing the actual performance of the trial advertisement with the performance of one or more alternative advertisements that could have been published instead of the trial advertisement.

If the trial advertisement has satisfactory performance, then the AM functionality can place the trial advertisement in a so-called normal CPT mode. Thus, step 1314 can link back to step 1306. But note that step 1306 is again followed by steps 1308 and 1310, meaning that, even in the normal mode, the AM functionality 108 periodically revisits its decision to publish the advertisement using the CPT mode. Once in the normal CPT mode, the statistical performance data collected in the trial mode can be used to effectively determine the expected value of the advertisement when required.

In step 1316, assuming that the performance of the advertisement is not satisfactory, the AM functionality 108 can present various options to the advertiser. The AM functionality 108 can present these options to the advertiser in any manner, such as via a graphical user interface dialog, via an E-Mail exchange, via telephonic communication session, and so forth.

In step 1318, one of the options presented to the advertiser is that the advertiser can be allowed to continue using the CPT mode. But in this case, the advertiser is asked to pay for the opportunity cost suffered by the ad network. This opportunity cost can be computed (in step 1320) in the manner described above, e.g., by considering the theoretical or actual performance of one or more alternative candidate advertisement that the AM functionality 108 "gave up" in order to publish the advertisement under consideration.

In step 1322, as another option, the advertiser is given the choice to enter the CPM mode. If the advertiser selects this choice, then the flow advances back to step 1304, and the advertising campaign from this point forward is conducted using the CPM model.

In step 1324, if none of the other options are selected, then, by default, the advertisement is de-activated. This can be performed by expressly de-activating the advertisement, or simply lowering its ranking score, so that it effectively cannot compete with more successful advertisements, and thus will not be published.

FIG. 14 summarizes the different modes that an advertisement may enter in the course of the operation of the procedure 1300. As shown there, a new advertisement is placed in either the trial CPT mode 1402 or the CPM mode 1404. From the trial CPT mode 1402, the advertisement can advance to the normal CPT mode 1406 if it "proves" itself, or can advance to either the CPM mode 1404 or an inactive mode 1408 if it fails to prove itself.

The procedures shown in FIGS. 13 and 14 are made possible by virtue of the fact that the AM functionality 108 allows for cross-model comparison. Namely, the AM functionality 108 computes expected values in a normalized manner, such that expected values for advertisements being priced using the CPM model can be effectively compared with expected values for advertisements being priced using the CPT model.

This allows for meaningful ranking of advertisements that adopt different pricing models.

For example, the expected values for CPM advertisements can comprise respective maximum per-impression bids. The expected values for CPT advertisements can comprise respective products of maximum bids, randomized CTR estimates, and conversion-to-click rates (for non-click CPT scenarios). These parameters can be scaled such that expected values in the CPM domain are directly comparable to expected values in the CPT domain. Further, the CPT paradigm itself can encompass many kinds of transaction models (e.g., depending on what constitutes a "transaction"). The parameters for different CPT models can be selected and scaled such that their expected values can be meaningfully compared with each other.

As another feature, the AM functionality 108 can simultaneously apply multiple pricing models and strategies to the same advertisements (even though only one model is being used to actually charge each advertiser). These models produce their own respective sets of competing performance data. Armed with such data, the AM functionality 108 can periodically make cross-model comparisons to determine whether it is currently using the optimal model (meaning the most profitable model) to price its advertisements. Indeed, the above-described type of cross-model comparison can be applied to any facet of the analysis performed by the AM functionality 108, as indicated above with respect to step 724 of FIG. 7. This analysis can be performed as a backend process, and may not necessarily be apparent to the advertiser.

In closing, a number of features were described herein by first identifying exemplary problems that these features can address. This manner of explication does not constitute an admission that others have appreciated and/or articulated the problems in the manner specified herein. Appreciation and articulation of the problems present in the relevant arts are to be understood as part of the present invention. More specifically, there is no admission herein that the features described in the Background section of this disclosure constitute prior art. Further, the description of a limited set of problems in the Background section does not limit the application of invention to solving only those problems; it can be applied to problems and environments not expressly identified herein. Further, the subject matter set forth in the Summary section and the Abstract of this disclosure do not limit the subject matter set forth in the claims.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer-implemented method of forming a performance estimate for an advertisement, from which to compute the advertisement's expected value, the method comprising:
    under control of one or more computer systems configured with executable instructions,
        receiving performance data associated with the advertisement;
        forming a probability distribution of possible performance estimates based, at least in part, on the received performance data associated with the advertisement; and
        randomly selecting the performance estimate from the probability distribution of possible performance estimates, such that the performance estimate includes a randomized component.

2. The method of claim 1, wherein the advertisement is priced using a cost per transaction (CPT) model, in which a cost-accruing event occurs when the advertisement induces a transaction.

3. The method of claim 2, wherein the CPT model is implemented as a cost per click (CPC) model, wherein the transaction is defined as a click event.

4. The method of claim 1, wherein the probability distribution is a normal distribution.

5. The method of claim 1, wherein a plurality of techniques are used to compute the probability distribution, wherein the method further comprises collecting performance data pertaining to the suitability of each of said techniques, and selecting a technique deemed most suitable.

6. The method of claim 1, further comprising:
    determining whether there is a deficiency of performance data for the advertisement; and
    if there is a deficiency, forming the probability distribution so that it is artificially elevated, to allow the advertisement to effectively compete with more mature advertisements.

7. The method of claim 6, wherein the probability distribution is characterized by at least one parameter, wherein the probability distribution is artificially elevated by elevating said at least one parameter.

8. A computer-implemented method of ranking advertisements, comprising:
    under control of one or more computer systems configured with executable instructions,
        identifying an advertisement-triggering event;
        identifying a set of K candidate advertisements that have a bearing on at least one characteristic associated with the advertisement-triggering event;
        estimating the value of each of the set of K candidate advertisements; and
        selecting a subset of N advertisements from the set of K candidate advertisements based on the estimated value of the K candidate advertisements,
        wherein the estimating of the value of the K candidate advertisements comprises, for each advertisement of the set of K candidate advertisements:
            forming a probability distribution of possible performance estimates based on performance data of the advertisement; and
            randomly selecting a performance estimate from the probability distribution of possible performance estimates to use as the estimated value of the advertisement.

9. The method of claim 8, wherein one or more of the set of K candidate advertisements are priced using a cost per transaction (CPT) model, in which a cost-accruing event occurs when an advertisement induces a transaction.

10. The method of claim 9, wherein the CPT model is implemented as a cost per click (CPC) model, wherein the transaction is defined as a click event.

11. The method of claim 8, wherein the selecting of a subset of N advertisements from the set of K candidate advertisements comprises:
    ranking the set of K candidate advertisements by their respective estimated expected values; and
    selecting the subset of N advertisements as the top N ranking advertisements.

12. The method of claim 8, wherein at least two of the set of K candidate advertisements are priced using different respective pricing models, and wherein the ranking is configured such as to accommodate normalized comparison between said at least two advertisements.

13. The method of claim 8, further comprising pricing the subset of N advertisements.

14. The method of claim 8, further comprising:
determining whether there is a deficiency of performance data for said at least one advertisement; and
if there is a deficiency, forming the probability distribution so that it is artificially elevated, to allow said at least one advertisement to effectively compete with more mature advertisements.

15. A system comprising:
a memory and a processor;
advertising management functionality stored in the memory and executable on the processor for evaluating the value of advertisements, comprising:
logic configured to identify a set of K candidate advertisements that have a bearing on at least one characteristic associated with an advertisement-triggering event;
logic configured to estimate the value of each of the set of K candidate advertisements; and
logic configured to select a subset of N advertisements from the set of K candidate advertisements based on the estimated value of the K candidate advertisements,
wherein the estimating of the value of the K candidate advertisements comprises, for each advertisement of the set of K candidate advertisements:
forming a probability distribution of possible performance estimates based on performance data of the advertisement; and
randomly selecting a performance estimate from the probability distribution of possible performance estimates to use as the estimated value of the advertisement; and
publication functionality stored in the memory and executable on the processor for publishing the N candidate advertisements identified by the advertising management functionality.

16. The system of claim 15, wherein the logic configured to select a subset of N advertisements from the set of K candidate advertisements is further configured to:
rank the set of K candidate advertisements by their respective estimated expected values; and
select the subset of N advertisements as the top N ranking advertisements.

17. The system of claim 15, further configured to price the subset of N advertisements.

18. The system of claim 15, further configured to:
determine whether there is a deficiency of performance data for said at least one advertisement; and
if there is a deficiency, form the probability distribution so that it is artificially elevated, to allow said at least one advertisement to effectively compete with more mature advertisements.

* * * * *